US007346325B2

(12) United States Patent
Maeda et al.

(10) Patent No.: US 7,346,325 B2
(45) Date of Patent: Mar. 18, 2008

(54) RECEIVER, RECEIVING METHOD AND PORTABLE WIRELESS APPARATUS

(75) Inventors: Koji Maeda, Kokubunji (JP); Satoshi Tanaka, Kokubunji (JP); Irei Kyu, Kokubunji (JP); Yukinori Akamine, Kokubunji (JP); Manabu Kawabe, Hachioji (JP)

(73) Assignee: Renesas Technology Corp., Tokyo (JP)

( * ) Notice: Subject to any disclaimer, the term of this patent is extended or adjusted under 35 U.S.C. 154(b) by 404 days.

(21) Appl. No.: 11/179,553

(22) Filed: Jul. 13, 2005

(65) Prior Publication Data

US 2006/0068739 A1 Mar. 30, 2006

(30) Foreign Application Priority Data

Sep. 30, 2004 (JP) ............................. 2004-287230

(51) Int. Cl.
*H04B 1/10* (2006.01)
(52) U.S. Cl. .................. 455/296; 455/63.1; 455/67.13; 375/346
(58) Field of Classification Search ............... 455/63.1, 455/67.11, 67.13, 189.1, 295, 296, 302, 307, 455/313, 323, 324, 334; 375/322, 324, 346, 375/349
See application file for complete search history.

(56) References Cited

U.S. PATENT DOCUMENTS 7,146,146 B2 * 12/2006 Masenten et al. ........... 455/296
7,158,586 B2 * 1/2007 Husted ........................ 375/324
7,254,379 B2 * 8/2007 Xu et al. ..................... 455/296

FOREIGN PATENT DOCUMENTS

JP 2004-040678 2/2004

* cited by examiner

*Primary Examiner*—Quochien B. Vuong
(74) *Attorney, Agent, or Firm*—Miles & Stockbridge P.C.

(57) ABSTRACT

This invention provides a receiver in which the calibration time by repeated operations to correct phase mismatch and amplitude mismatch between I and Q signals can be reduced. The receiver comprises mixers which convert received RF signals into quadrature modulated IF signals, signal paths which filter and amplify and output the quadrature modulated signals output from the mixers, a calibration circuit which calibrates phase and amplitude mismatches between the I and Q components of the quadrature modulated signals output through the signal paths, a frequency converter which, when the mixers or the signal paths selected output calibration signals with IF frequency instead of the quadrature modulated signals, converts the calibration signals into those with a frequency higher than IF frequency, and an arithmetic operation circuit which calculates phase and amplitude mismatches from the calibration signals output by the frequency converter and outputs calculation results. The calibration circuit executes calibration, using the calculation results.

20 Claims, 18 Drawing Sheets

RECEIVER, RECEIVING METHOD AND PORTABLE WIRELESS APPARATUS

CLAIM OF PRIORITY

The present application claims priority from Japanese application JP 2004-287230 filed on Sep. 30, 2004, the content of which is hereby incorporated by reference into this application.

FIELD OF THE INVENTION

The present invention relates to a receiver in a wireless system and, in particular, to a technique for correcting amplitude mismatch and phase mismatch between in-phase and quadrature components of a quadrature modulated signal.

BACKGROUND OF THE INVENTION

A wireless system in which transmit data is divided into in-phase (I) and quadrature (Q) components and radio frequency (RF) quadrature modulated signals are generated by modulating carriers which are 90 degrees out of phase with each other by these I and Q components is used for mobile phones or the like. In a receiver for use in such wireless system, instead of a heterodyne system in which RF signals are once converted into intermediate frequency (hereinafter abbreviated to IF) signals and the IF signals are demodulated into I and Q signals, a direct conversion system in which received signals (RF quadrature modulated signals) are directly demodulated into I and Q signals, which is known as a zero-IF system, has been put into use. Because the zero-IF system dispenses with IF amplification and filtering, the receiver with fewer components than when using the heterodyne system can be constructed. The zero-IF system can contribute to downsizing and cost reduction which are strongly required for wireless devices.

In the zero-IF system, however, phase mismatch and amplitude mismatch between I and Q signals are liable to occur and these mismatches are liable to result in bit errors in demodulated data. To avoid this problem, a demodulator arranged to detect I-Q phase and amplitude mismatches and correct these mismatches, using detection results, is disclosed in JP-A No. 2004-40678.

SUMMARY OF THE INVENTION

Moreover, a low-IF system in which received signals are frequency converted into low IF frequency close to DC has recently come to be used. In the low-IF system, amplification and filtering at low IF frequency are performed by amplifiers and filters that are simpler than those for the above conventional RF-to-IF conversion. The low-IF system allows for downsizing and cost reduction of wireless devices.

A receiver using the low-IF system and a receiver using the zero-IF system can be realized in almost the same configuration. FIG. 15 shows an example of a receiver configuration using the low-IF system or zero-IF system. In FIG. 15, RF-band signals received by an antenna 137 are amplified by a low noise amplifier (LNA) 138 and input to mixers 139 and 140.

Here, in the receiver using the low-IF system, by a phase locked loop (PLL) 148, carriers with a frequency slightly lower than the radio frequency of the received signals are generated, based on a reference signal 149. Generated carriers are input to two mixers; one is directly input to a mixer 139 and another is input via a 90-degree phase shifter 147 to a mixer 140. The received signals are multiplied with the carriers at the mixers 139 and 140 and converted into signals with a low IF frequency close to DC. Then, the low IF signals are filtered by low-pass filters 141 and 142 for spurious rejection, gain is adjusted by automatic gain controlled amplifiers 143 and 144, and converted into digital signals by analog-digital converters (ADC) 145 and 146. The gain of the automatic gain controlled amplifiers 143 and 144 is controlled by a control circuit (CTRL) 150 which inputs a control signal provided from a baseband (BB) circuit.

Meanwhile, in the receiver using the zero-IF system, the same processing as above is performed except that the PLL 148 generates carriers with the same frequency as the frequency of received signals and the received signals are directly frequency converted into signals with a baseband frequency. That is, analog baseband signals output from the multipliers 139 and 140 are filtered by the low-pass filters 141 and 142 for spurious rejection, gain is adjusted by the automatic gain controlled amplifiers 143 and 144, and converted into digital baseband signals by the ADCs 145 and 146.

The receiver using the low-IF system has problems common to the receiver with the above zero-IF system. Specifically, the carriers from the PLL 148 experience different amounts of delay before being input to the multipliers 139 and 140. Analog elements on the I signal path and those on the Q signal path somewhat vary in characteristics due to manufacturing variance. In consequence, this gives rise to a problem in which phase mismatch and amplitude mismatch between I and Q components might be introduced in the signals output from the ADCs 145 and 146. This problem causes bit error rate (BER) deterioration when receiving. Especially for communication using a multilevel modulation scheme such as 16 Quadrature Amplitude Modulation (QAM) and 64 QAM for high-speed communication purposes, the phase and amplitude mismatches greatly affect the BER.

Furthermore, in the low-IF system, when a received signal with a frequency of $f_{LO}+f_{IF}$ is frequency converted into an IF frequency $f_{IF}$ by using a carrier with a frequency of $f_{LO}$, an interfering wave (with a frequency of $f_{LO}-f_{IF}$) adjacent to the received signal is superimposed on the received signal as an image signal centered at the IF frequency $f_{IF}$, as is illustrated in FIG. 16A. Here, if image rejection is performed when the received signal is frequency converted from the IF band to the baseband, the image signal frequency becomes $2f_{IF}$ and the received signal and the superimposed image signal can be separated, as is illustrated in FIG. 16B. By further spurious rejection with the low-pass filter (LPF), only the received signal can be extracted.

However, image rejection is highly sensitive to the above phase and amplitude mismatches between the I and Q components. FIG. 17A shows a relationship between Image Rejection Ratio (IRR) and phase mismatch and FIG. 17B shows a relationship between IRR and amplitude mismatch. For example, the standards of Global System for Mobile communications (GSM) for mobile phones specify that IRR of 50 dB or more is required at IF frequency of 200 kHz, when phase mismatch shall be about 0.4 degrees or less and amplitude mismatch shall be about 0.6% or less.

The above I and Q components of a quadrature modulated signal can assume different values each time a receive channel is set up.

In the above prior art reference (JP-A No. 2004-40378), phase mismatch and amplitude mismatch of Q components to I components of baseband signals are detected and the mismatches are corrected by repeated operations. Generally, for high-precision mismatch correction by repeated operations like the above prior art example, output mismatches must be averaged for a long time to reduce mismatch variance; this leads to a problem of long calibration time required. Consequently, during signal reception, for example, such an event may occur that calibration does not finish when a channel switchover occurs. With the use of the prior art method, it is impossible to achieve mismatch reduction to the target level and BER might be deteriorated.

If, for example, the above prior art example is used as is in the low-IF system, simultaneous receiving of a desired wave and an image wave poses a problem in which correct calibration cannot be attained, affected by the image signal.

An object of the present invention is to provide a receiver, a receiving method, and a portable wireless apparatus in which the calibration time by repeated operations to correct phase mismatch and amplitude mismatch between I and Q signals can be reduced.

To achieve the above object, a receiver of the present invention comprises mixers which convert received signals having I and Q components with a first frequency into quadrature modulated signals with a second frequency, signal paths which filter and amplify and output the quadrature modulated signals output from the mixers, a calibration circuit for phase and amplitude mismatch which calibrates phase and amplitude mismatches between the I and Q components of the quadrature modulated signals output through the signal paths, a frequency converter which, when the mixers or the signal paths selected output calibration signals having I and Q components with the second frequency instead of the quadrature modulated signals, converts the calibration signals into calibration signals with a third frequency higher than the second frequency, and an arithmetic operation circuit which calculates phase and amplitude mismatches between the I and Q components from the calibration signals with the third frequency output by the frequency converter and outputs calculation results, characterized in that the calibration circuit for phase and amplitude mismatch executes the calibration, using the calculation results.

Since the frequency of the calibration signals by which phase mismatch and amplitude mismatch calculations are carried out is higher than the second frequency (IF frequency), the time for integrations for the calculations is shortened and the calibration time by repeated operations can be reduced, as will be detailed later. It is desirable that, after converting the calibration signals with the second frequency into baseband signals and spurious is eliminated from the baseband signals, the frequency converter converts the baseband signals into the calibration signals with the third frequency. Correct mismatch calculations can be executed without being affected by spurious that impairs convergence of the arithmetic operation circuit. The receiver includes signal sources for calibration and does not use received signals as calibration signals which is done so in the above prior art example, even when the receiver uses the low-IF system, accurate calibration can always be performed. The present invention is applied to both the receiver using the zero-IF receiving system and the receiver using the low-IF receiving system and having nearly the same configuration as the former.

According to the present invention, mismatch calculations are performed on the calibration signals with a frequency higher than IF frequency and, consequently, the calibration time by repeated operations can be reduced.

DETAILED DESCRIPTION OF THE PREFERRED EMBODIMENTS

A receiver, receiving method, or portable wireless apparatus in which the present invention resides will be fully described hereinafter with reference to some illustrative embodiments thereof.

First Embodiment

Figure 1:
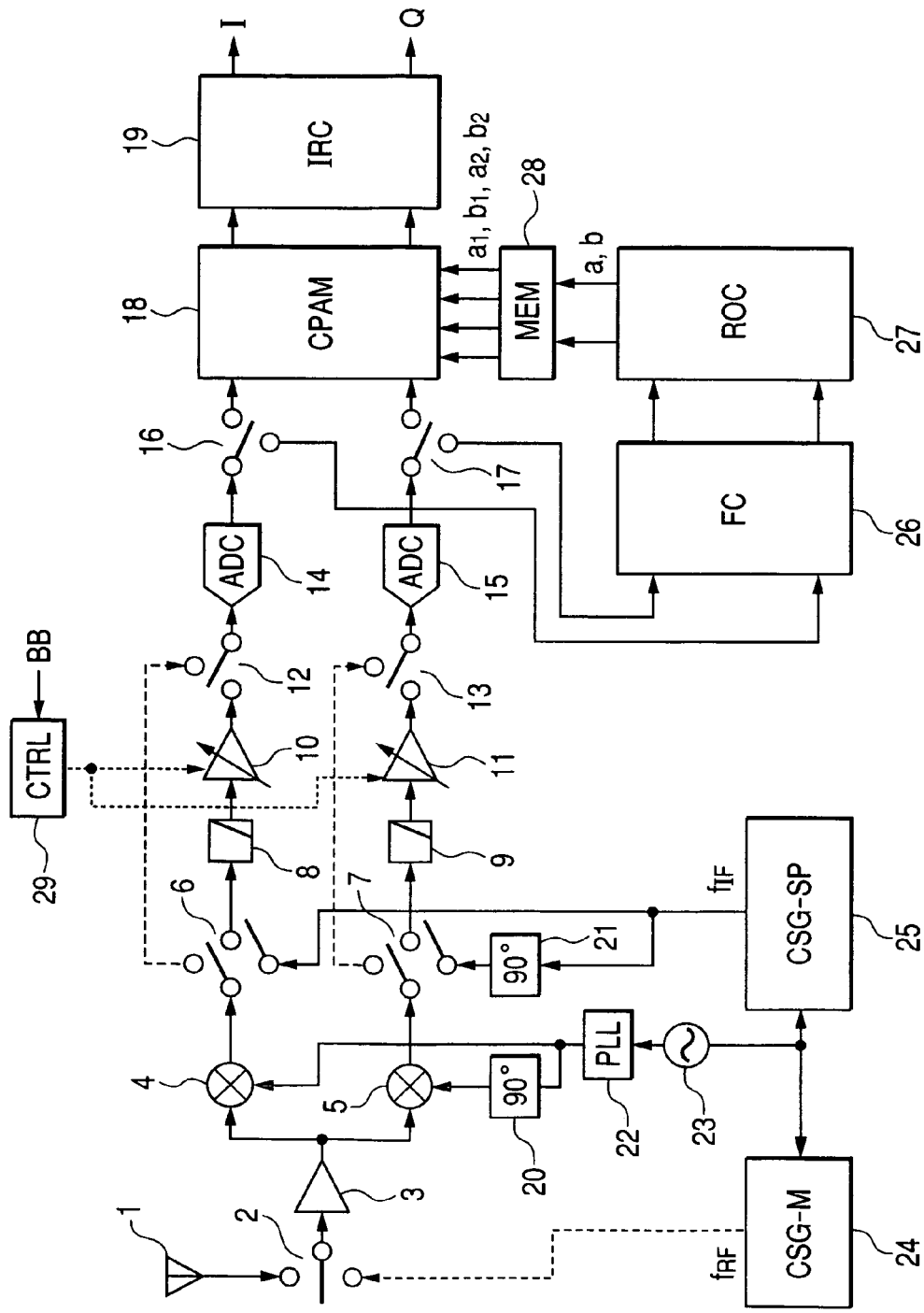
FIG. 1 is a block diagram to explain a first embodiment of a receiver in which the present invention resides.

FIG. 1 shows a first embodiment of the present invention. This embodiment is a receiver using the low-IF system. The low-IF receiver shown in FIG. 1 comprises an antenna 1, switches 2, 6, 7, 12, 13, 16, and 17, an LNA 3, mixers 4 and 5, low-pass filters 8 and 9, automatic gain controlled amplifiers 10 and 11, analog-digital converters 14 and 15, a calibration circuit for phase and amplitude mismatch (CPAM) 18, an image rejection circuit (IRC) 19 which outputs in-phase (I) and quadrature (Q) components of baseband signals, 90-degree phase shifters 20 and 21, a PLL 22, a crystal oscillator 23, a calibration signal generator for mixer (CSG-M) 24 which generates a calibration signal with a radio frequency (first frequency) fRF, a calibration signal generator for signal path (CSG-SP) 25 which generates a calibration signal with an IF frequency (second frequency) $f_{IF}$, a frequency converter (FC) 26, a memory (MEM) 28, a repeated operation circuit (ROC) 27, and a control circuit 29.

Operation of the receiver configured as above will be described below.

The receiver of this embodiment has three modes: a mismatch calibration mode for mixer to calibrate phase and amplitude mismatches occurring in the mixers 4 and 5, a mismatch calibration mode for signal path to calibrate phase and amplitude mismatches occurring in signal paths which at least amplify and output the signals output from the mixers 4 and 5, that is, the signal paths via the low-pass filters 8 and 9 and the automatic gain controlled amplifiers 10 and 11 in this embodiment, and a receiving mode to receive RF signals and convert them into baseband signals.

Figure 2:
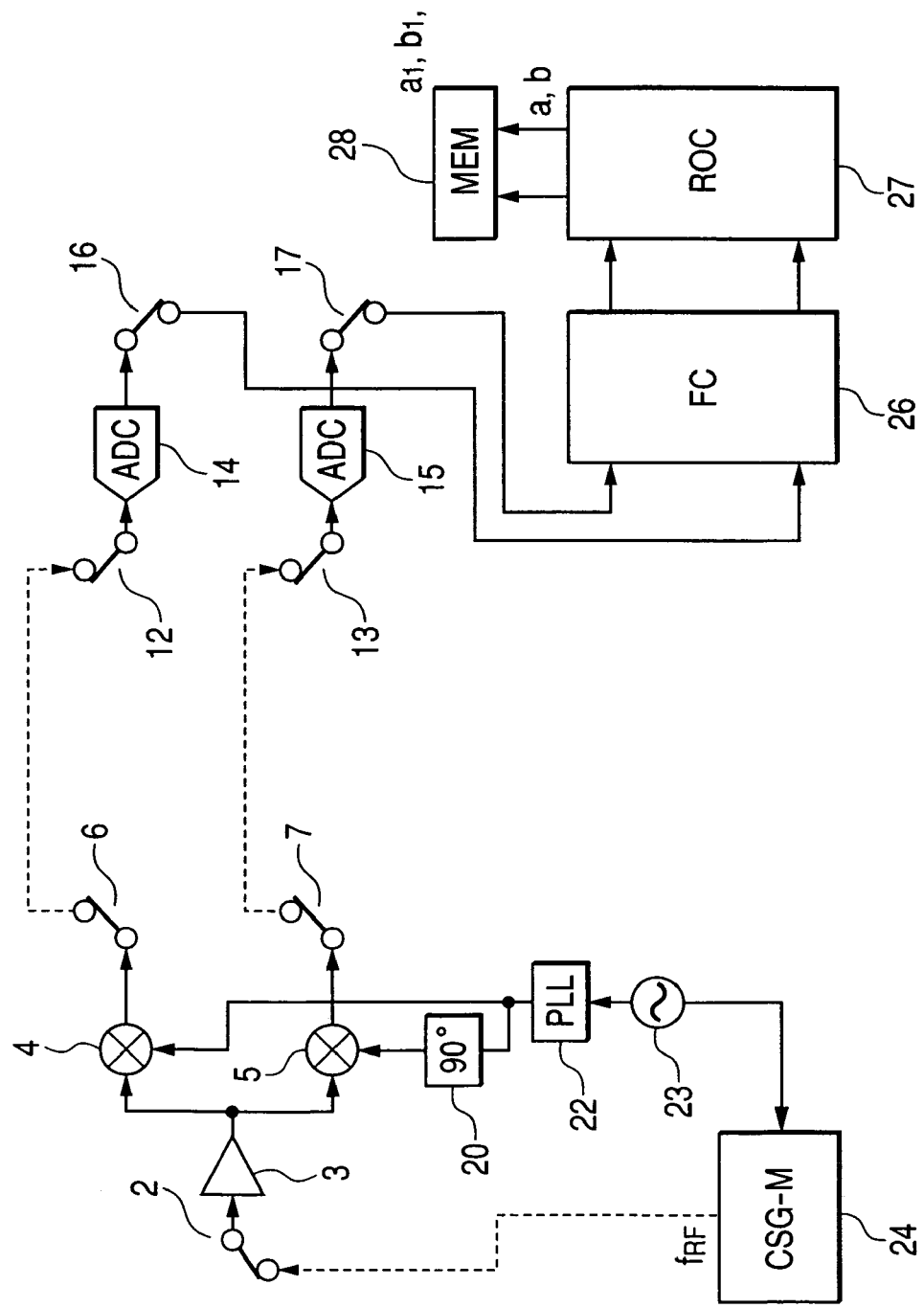
FIG. 2 is a block diagram to explain calibration operation in mismatch calibration mode for mixer involved in the first embodiment.

Calibration operation in mismatch calibration mode for mixer will be described with FIG. 2. A mismatch calibration signal for mixer in an RF band (with a frequency fRF) which is generated by the calibration signal generator for mixer 24 from a clock signal generated by the crystal oscillator 23 is input via a switch 2 to the LNA 3 where this signal is amplified. The clock signal is supplied as a reference signal to the PLL 22 and used as a time reference signal to all parts of the receiver.

The mismatch calibration signal for mixer is then input to the mixers 4 and 5, quadrature modulated, and frequency converted into an IF frequency. Based on the clock signal generated by the crystal oscillator 23, the PLL 22 generates carriers, one of which is input to the mixer 4. Another carrier becomes a quadrature component thereof by passing through the 90-degree phase shifter 20 and is input to the mixer 5. At this time, phase and amplitude mismatches might be introduced in the outputs of the mixers 4 and 5, mainly due to a delay between the I component and Q component occurring in the two carrier paths and a mismatch between the mixers.

The mismatch calibration signals for mixer output from the mixers 4 and 5 are input via switches 6 and 7 to switches 12 and 13 and converted into digital signals by the analog-digital converters 14 and 15.

Then, the mismatch calibration signals for mixer are input via switches 12 and 13 to the frequency converter 26, frequency converted into a frequency (third frequency) higher than IF frequency, and input to the repeated operation circuit 27. The repeated operation circuit 27 detects phase and amplitude mismatches occurred in the mixers 4 and 5, using the input mismatch calibration signals for mixer, derives calibration values a and b suitable for the mismatches, and stores the values as $a_1$ and $b_1$ (first operation results) into the memory 28.

The amplitude and phase mismatches between the I and Q components occurring in the above mixers 4 and 5 are mainly due to a delay between the carrier paths and manufacturing variance of the mixers 4 and 5 and do not vary greatly during signal reception. Therefore, calibration in mismatch calibration mode for mixer may preferably be performed immediately before a portable wireless apparatus (wireless device) equipped with the receiver of the present invention is shipped from the factory or when the portable wireless apparatus is powered on.

The configurations and operations of the calibration signal generator for mixer 24, frequency converter 26, and repeated operation circuit 27 will be described later.

Figure 3:
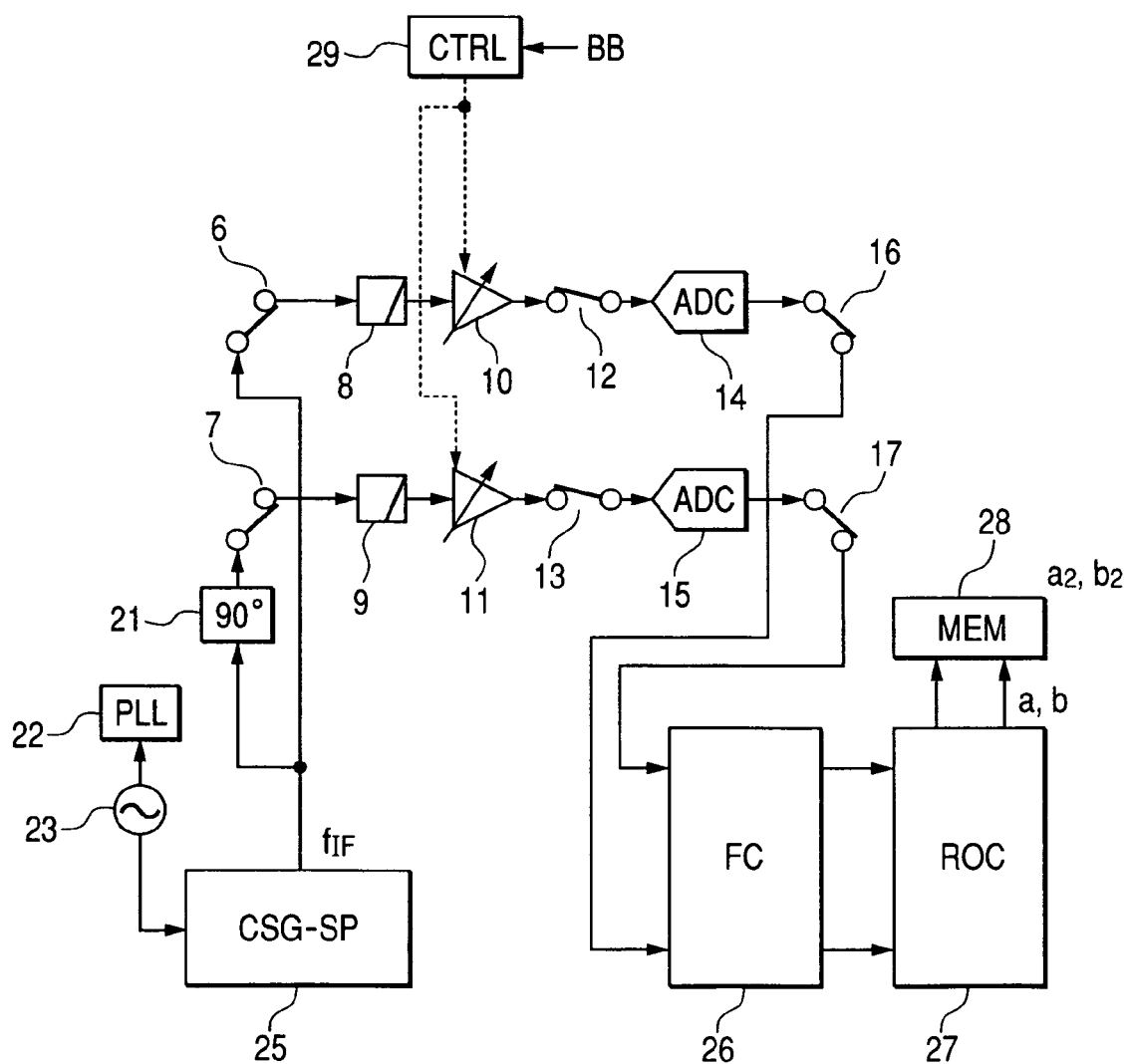
FIG. 3 is a block diagram to explain calibration operation in mismatch calibration mode for signal path involved in the first embodiment.

Next, calibration operation in mismatch calibration mode for signal path will be described with FIG. 3. A mismatch calibration signal for signal path in an IF band (with a frequency $f_{IF}$) which is generated by the calibration signal generator for signal path 25 from the clock signal generated by the crystal oscillator 23 is input to a switch 6. Another mismatch calibration signal for signal path generated by the same generator becomes a quadrature component thereof by passing through the 90-degree phase shifter 21 and is input to a switch 7. Then, both mismatch calibration signals for signal path pass through the low-pass filters 8 and 9 and the automatic gain controlled amplifiers 10 and 11 and are input to the switches 12 and 13. At this time, phase and amplitude mismatches between I and Q components of the mismatch calibration signals for signal path are introduced due to a mismatch between the two signal paths including the low-pass filters 8 and 9 and the automatic gain controlled amplifiers 10 and 11, respectively.

The mismatch calibration signals for signal path output from the switches 12 and 13 are converted into digital signals by the analog-digital converters 14 and 15. Then, the mismatch calibration signals for signal path are input via switches 16 and 17 to the frequency converter 26, frequency converted into a frequency higher than IF frequency, for example, a frequency near Nyquist frequency, and input to the repeated operation circuit 27. The repeated operation circuit 27 detects phase and amplitude mismatches occurred in the above signal paths, using the mismatch calibration signals for signal path, derives calibration values a and b suitable for the mismatches, and stores the values as $a_2$ and $b_2$ (second operation results) into the memory 28.

The amplitude and phase mismatches between I and Q components occurring in the above signal paths are mainly due to the low-pass filters 8 and 9 and the automatic gain controlled amplifiers 10 and 11. The low-pass filters 8 and 9 have temperature-dependent characteristics and the automatic gain controlled amplifiers 10 and 11 may produce different gain errors each time receive channel selection is made. Therefore, calibration in mismatch calibration mode for signal path should be performed every time before receiving signals, for example, burst signals after a channel selection.

Figure 4:
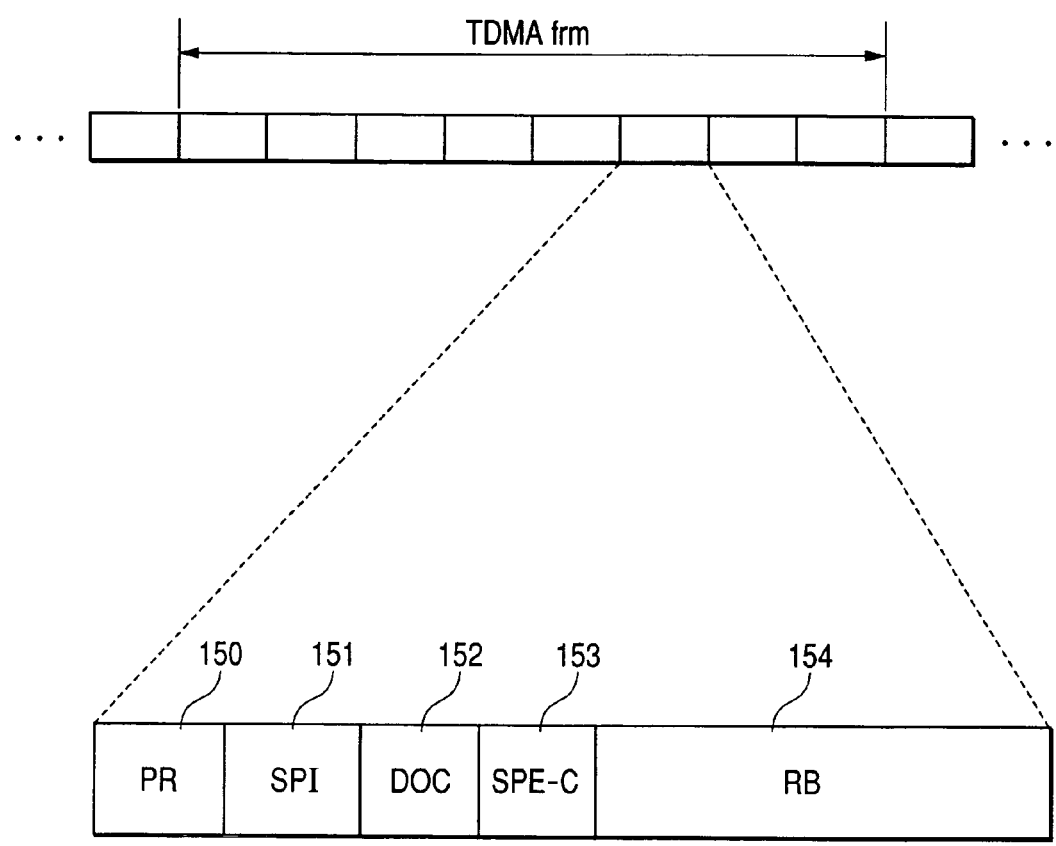
FIG. 4 is a diagram to explain calibration timing in mismatch calibration mode for signal path involved in the first embodiment.

Calibration timing in mismatch calibration mode for signal path for an instance where the present invention is applied to the GSM system is shown in FIG. 4. One frame (TDMA frm) consists of eight bursts. Before receiving a burst, the receiver reads parameters such as AGC gain (PR 150), based on radio environment measurements taken during the reception of the previous frame burst, followed by locking synthesizer (SPI 151). After DC offset calibration is done (DOC 152), calibration in mismatch calibration mode for signal path is performed (SPE-C153). After finishing all calibrations, the receiver receives the burst (RB 154).

The configuration and operation of the calibration signal generator for signal path 25 will be described later.

Figure 5:
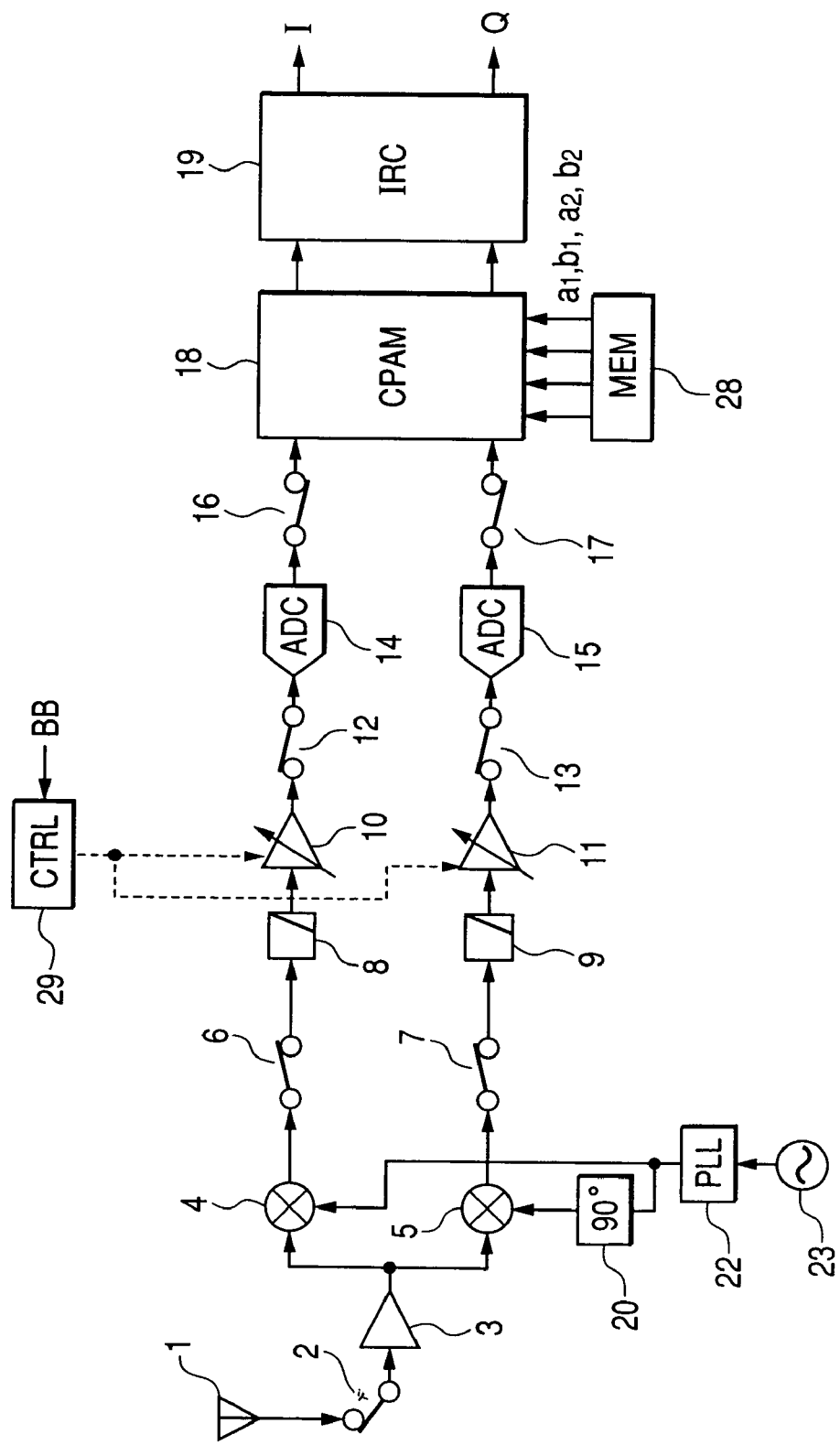
FIG. 5 is a block diagram to explain receiving operation in receiving mode involved in the first embodiment.

Operation in receiving mode will be described below with FIG. 5. I and Q component signals with a radio frequency (first frequency) received by the antenna 1 pass through the switch 2 and LNA 3 and are input to the mixers 4 and 5 where they are quadrature modulated and frequency converted into IF signals. Thereby, quadrature modulated IF signals are output from the mixers 4 and 5. For quadrature modulation, the PLL 22 generates carriers, based on the reference signal generated by the crystal oscillator 23, wherein one carrier is directly input to the mixer 4 and another is input to the 90-degree phase shifter 20 whose Q-component output is input to the mixer 5.

Then, the quadrature modulated IF signals pass through the switches 6 and 7 and the low-pass filters 8 and 9 where spurious is eliminated, input to the automatic gain controlled amplifiers 10 and 11 where the signals are adjusted to a suitable gain, further go through the switches 12 and 13, and eventually converted into digital signals by the analog-digital converters 14 and 15. The digital quadrature modulated signals are input via switches 16 and 17 to the calibration circuit for phase and amplitude mismatch 18.

The calibration circuit for phase and amplitude mismatch 18 retrieves the calibration values $a_1$, $b_1$ and $a_2$, $b_2$ to calibrate phase and amplitude mismatches calculated in the above mismatch calibration mode for mixer and mismatch calibration mode for signal path from the memory 28 and corrects the mismatches between I and Q components of the quadrature modulated signals, using the calibration values. The quadrature modulated signals output from the calibration circuit for phase and amplitude mismatch 18 are input to the image rejection circuit 19 where high-precision image signal rejection takes place and the modulated signals are frequency converted into I and Q components of baseband signals.

The following will describe the configurations and operations of the calibration circuit for phase and amplitude mismatch 18 and the image rejection circuit 19.

Figure 6:
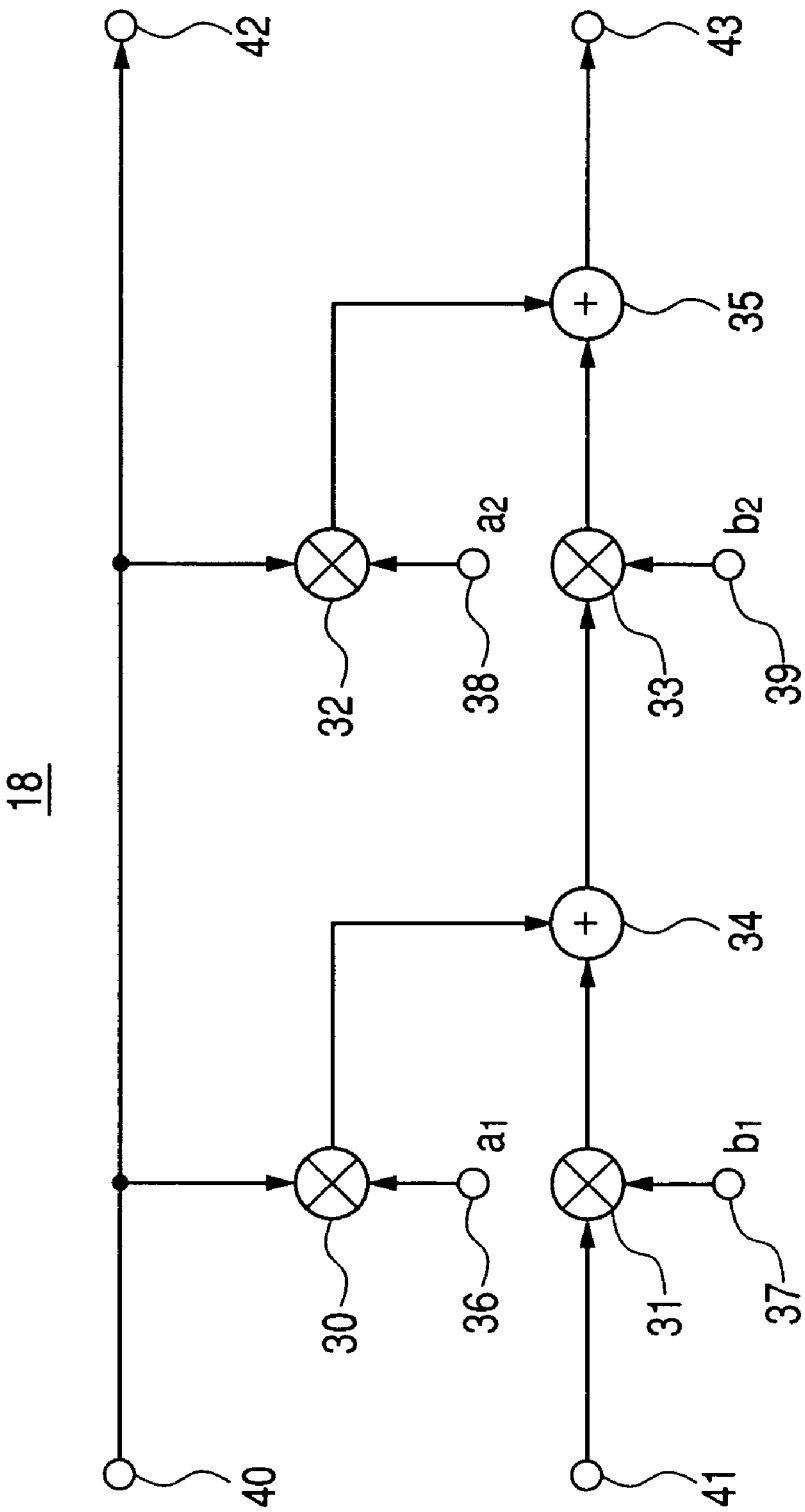
FIG. 6 is a block diagram to explain a calibration circuit for phase and amplitude mismatch involved in the first embodiment.

FIG. 6 shows an example of a configuration of the calibration circuit for phase and amplitude mismatch 18 involved in the present embodiment. The calibration circuit for phase and amplitude mismatch 18 shown in FIG. 6 comprises multipliers 30 to 33, digital adders 34 and 35, input terminals 36 to 41, and output terminals 42 and 43.

By the calibration circuit configuration of FIG. 6, the phase and amplitude of the Q-component signal can be varied with the I-component signal. For example, when A cos ωt and Aα sin ((ωt+θ) are input to input terminals 40 and 41, output IM of a digital adder 34 can be expressed by the following equation (2.1) from the configuration of FIG. 6. The equation (2.1) can be transformed into equation (2.2).

[Equations 1]

$$IM = a_1 \cdot A \cdot \cos(\omega t) + b_1 \cdot A\alpha \sin(\omega t + \theta) \quad (2.1)$$

$$= A\sqrt{a_1^2 + 2\alpha a_1 b_1 \sin\theta + b_1^2 \alpha^2} \, \sin(\omega t + \beta) \quad (2.2)$$

where, $$\beta = \tan^{-1}\left(\frac{a_1 + b_1 \alpha \sin\theta}{b_1 \alpha \cos\theta}\right)$$

In the above equations, α is amplitude mismatch and θ is phase mismatch. Then, by selecting values of $a_1$ and $b_1$ fulfilling the following equation (2.3):

[Equation 2]

$$a_1^2 + 2\alpha a_1 b_1 \sin\theta + b_1^2 \alpha^2 = 1$$

and $a_1 + b_1 \alpha \sin\theta = 0$ (2.3)

Q signal with amplitude equaling the amplitude of I component, which is accurately orthogonal to I, can be obtained.

Figure 7:
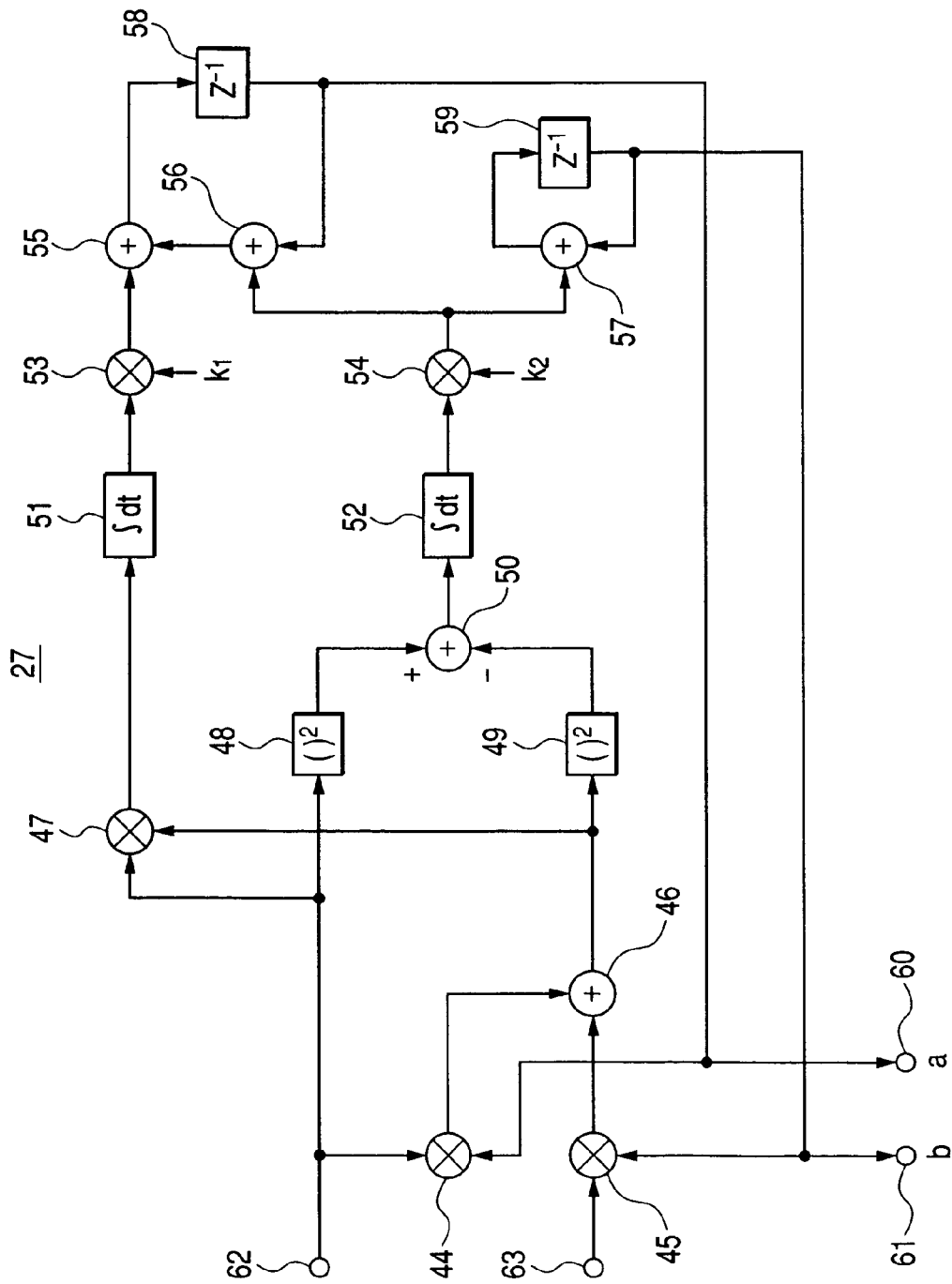
FIG. 7 is a block diagram to explain a repeated operation circuit involved in the first embodiment.

FIG. 7 shows an example of a configuration of the repeated operation circuit 27 involved in the present embodiment. The repeated operation circuit 27 shown in FIG. 7 comprises multipliers 44, 45, 47, 53, and 54, digital adders 46, 55, 56, and 57, digital square multipliers 48 and 49, a digital subtractor 50, digital integrators 51 and 52, delay elements 58 and 59, input terminals 62 and 63, and output terminals 60 and 61.

By the repeated operation circuit configuration of FIG. 7, suitable values of a and b for correcting the phase and amplitude mismatches between I and Q components of the quadrature signals can be calculated. A section consisting of multipliers 44 and 45 and an adder 46 operates on the principle of the equations (2.1), (2.2) and (2.3), where, by varying the values of a and b, the phase and amplitude of the Q component can be varied.

If there is a phase difference of accurately 90 degrees between the I component of a quadrature signal that is input from an input terminal 62 and the Q component that is output from the adder 46 and the I and Q components have equal amplitudes, the integrators 51 and 52 output zeros, fulfilling the conditions of the following equations (3.1) and (3.2), respectively. Here, angular frequency of input signal is ω, cycle is T, amplitude of I component is Re, and amplitude of Q component is Im.

[Equations 3]

$$\int_{-T}^{T} \sin\omega t \cdot \cos\omega t \, dt = 0 \quad (3.1)$$

$$\int_{-T}^{T} (\text{Re})^2 - (\text{Im})^2 \, dt = 0 \quad (3.2)$$

Equation (3.1) means that the quadrature condition is fulfilled and equation (3.2) means that I component and Q component have equal power. However, if mismatches are present between the I and Q components, the integrators 51 and 52 output non-zero values Ep and Ea representing mismatch components. Hence, closed loop control using multipliers 53 and 54, adders 55 to 57, and delay elements 58 and 59 is performed so that these mismatch components become asymptotic to zero. In the configuration of FIG. 7, the values of a and b are updated as expressed by the following equations (3.3) and (3.4).

[Equations 4]

$$a_i = a_{i-1} + k_2 E a_{i-1} \quad (3.3)$$

$$b_i = b_{i-1} + k_1 E p_{i-1} + k_2 E a_{i-1} \quad (3.4)$$

In the above equations, $k_1$ and $k_2$ are step gains that assume any constant whose absolute value is less than 1. Equations (3.3) and (3.4) indicate that adding weighted mismatch component(s) to an old estimator gives a new estimator.

Such a method usually involves long calibration time because estimate values of a and b have great variance, it is needed to average the estimate values effectively. It is preferable to use a moving average element in each of the integrators 51 and 52, which enables averaging the estimate values, discarding past estimate values representing large mismatches, and, therefore, shorter calibration can be done. Given that an n-moving average is performed, where the greater the number n, the shorter will be the calibration time.

Figure 8:
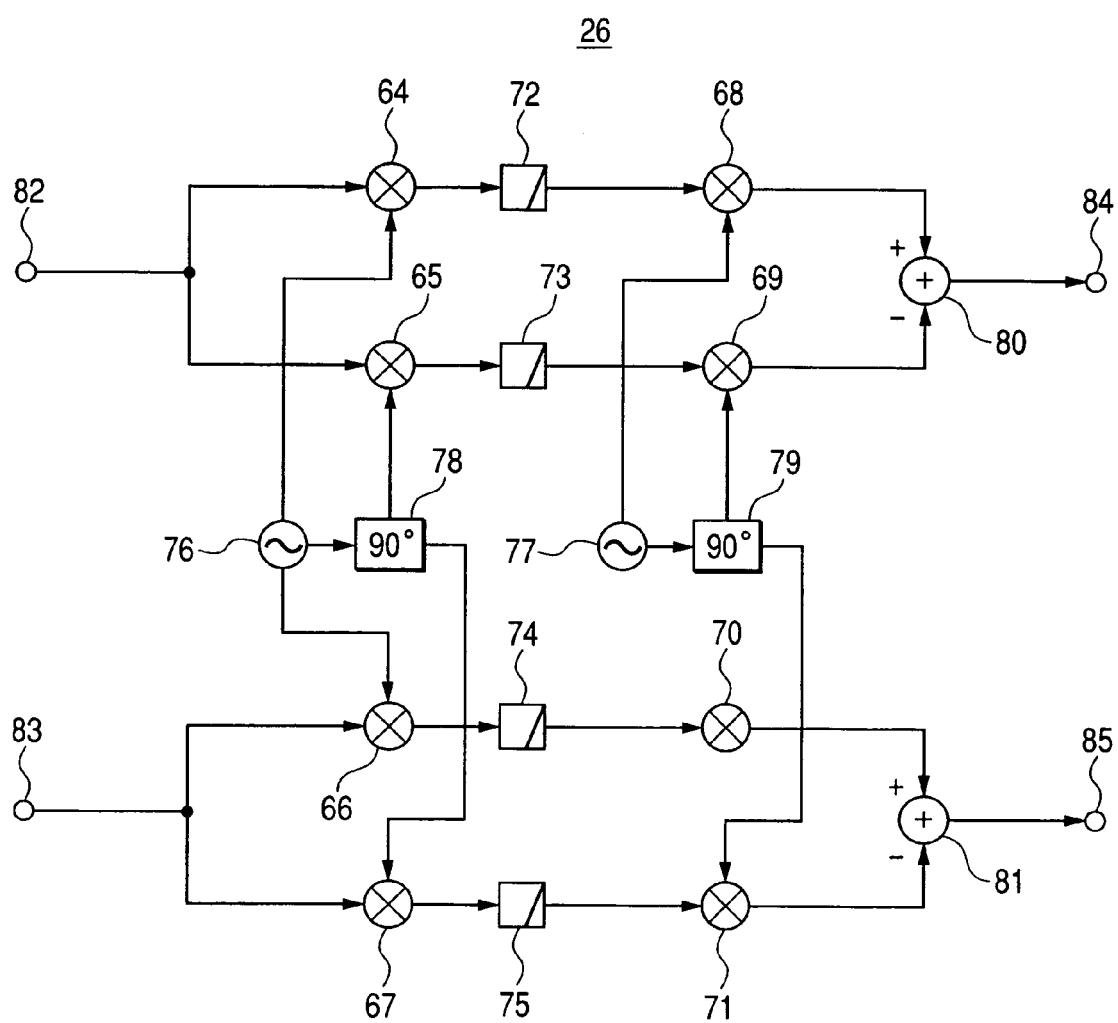
FIG. 8 is a block diagram to explain a frequency converter involved in the first embodiment.

FIG. 8 shows an example of a configuration of the frequency converter 26 involved in the present embodiment.

The frequency converter 26 shown in FIG. 8 comprises multipliers 64 to 71, low-pass filters 72 to 75, digital subtractors 80 and 81, digital oscillators 76 and 77, digital 90-degree phase shifters 78 and 79, input terminals 82 and 83, and output terminals 84 and 85.

By the frequency converter configuration of FIG. 8, the above calibration signals are frequency converted into those with a frequency higher than IF frequency. A digital oscillator 76 and a digital phase shifter 78 generate complex tone signals with IF frequency. Calibration signals input from input terminals 82 and 83 are multiplied with the tone signals by multipliers 64 to 67, thereby the calibration signals are once frequency converted into baseband signals. When frequency conversion into baseband signals is performed, information for phase and amplitude mismatches between the I and Q components of the calibration signals is not lost by this configuration.

Then, spurious is eliminated with the low-pass filters 72 to 75. It is preferable to use the low-pass filters with a cut-off frequency being lower than the signal band, so that the calibration signals can be made closer to the tone signals and noise components deteriorating the calibration performance by the above repeated operations can be eliminated, which shortens the calibration time.

Furthermore, a digital oscillator 77 and a digital phase shifter 79 generate complex tone signals with a frequency higher than IF frequency. The calibration signals output from the low-pass filters 72 to 75 are multiplied with these tone signals by multipliers 68 to 71. As a result, the calibration signals are frequency converted into those with a frequency higher than IF frequency. Preferably, the calibration signals should be converted to a frequency as close as possible to Nyquist frequency, provided that phase and amplitude mismatch information is preserved even after the conversion.

The higher frequency the calibration signals that are input to the repeated operation circuit, the more cycles of integration per unit time the above integrators 51 and 52 will execute. Consequently, more averaging operations can be performed within a short period of time and, thus, the calibration time by the above repeated operations can be reduced.

Figure 9:
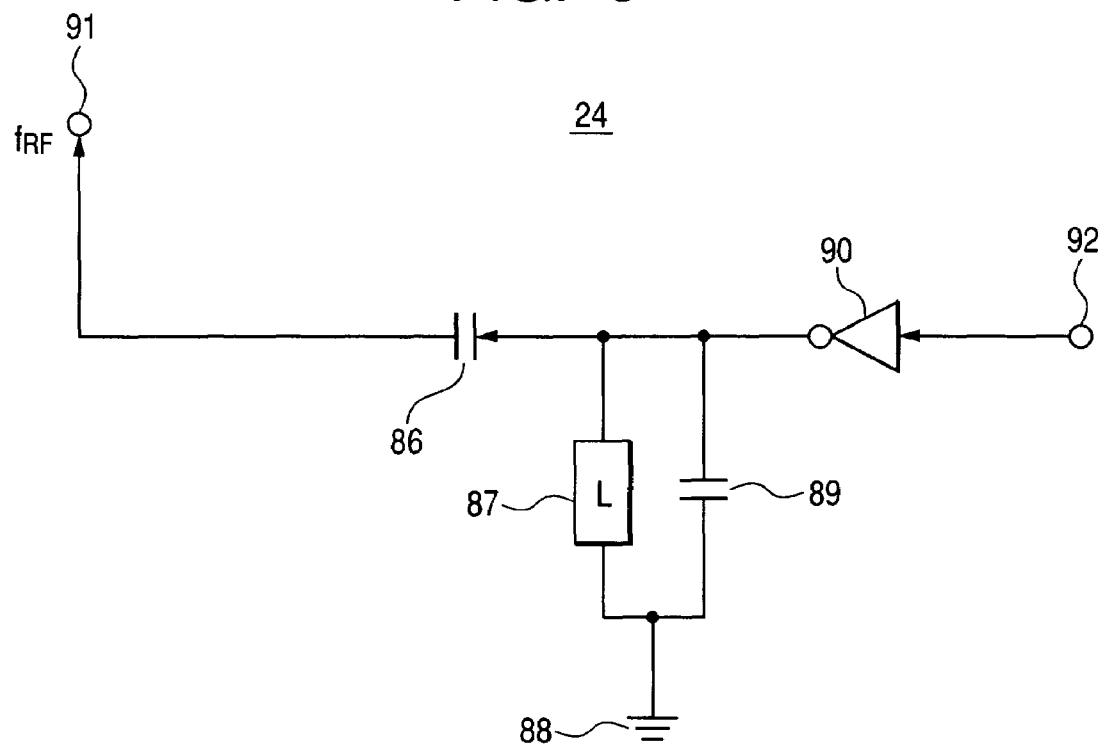
FIG. 9 is a block diagram to explain a calibration signal generator for mixer involved in the first embodiment.

FIG. 9 shows an example of a configuration of the calibration signal generator for mixer 24 involved in the present embodiment. The calibration signal generator for mixer 24 shown in FIG. 9 comprises capacitors 86 and 89, an inductor 87, a ground 88, an inverter 90, an input terminal 92, and an output terminal 92.

By the calibration signal generator configuration of FIG. 9, the above mismatch calibration signals for mixer are generated. The reference signal generated by the crystal oscillator 23 is input through the input terminal 92 to the calibration signal generator for mixer 24. At the output of the inverter 90, the reference signal appears as a rectangular wave. The rectangular wave includes a great number of harmonics of a high order. From among the harmonics, a particular-order harmonic wave is extracted by a resonator consisting of the inductor 87 and a capacitor 89. The DC component of the extracted harmonic signal is cut by a capacitor 86. The signal passing through the capacitor 86 is used as the above mismatch calibration signal for mixer.

Figure 10:
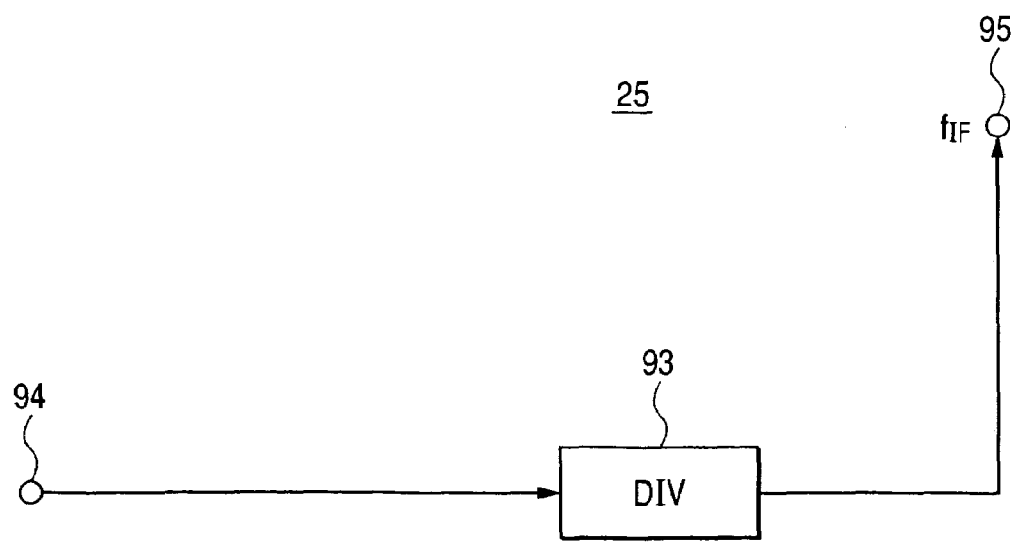
FIG. 10 is a block diagram to explain a calibration signal generator for signal path involved in the first embodiment.

FIG. 10 shows an example of a configuration of the calibration signal generator for signal path 25 involved in the present embodiment. The reference signal input from an input terminal 94 is input to a divider 93 and the signal is frequency divided into signals having a frequency equaling IF frequency. The signals output from the divider 93 to an output terminal 95 are used as the above calibration signals for signal path.

Figure 11:
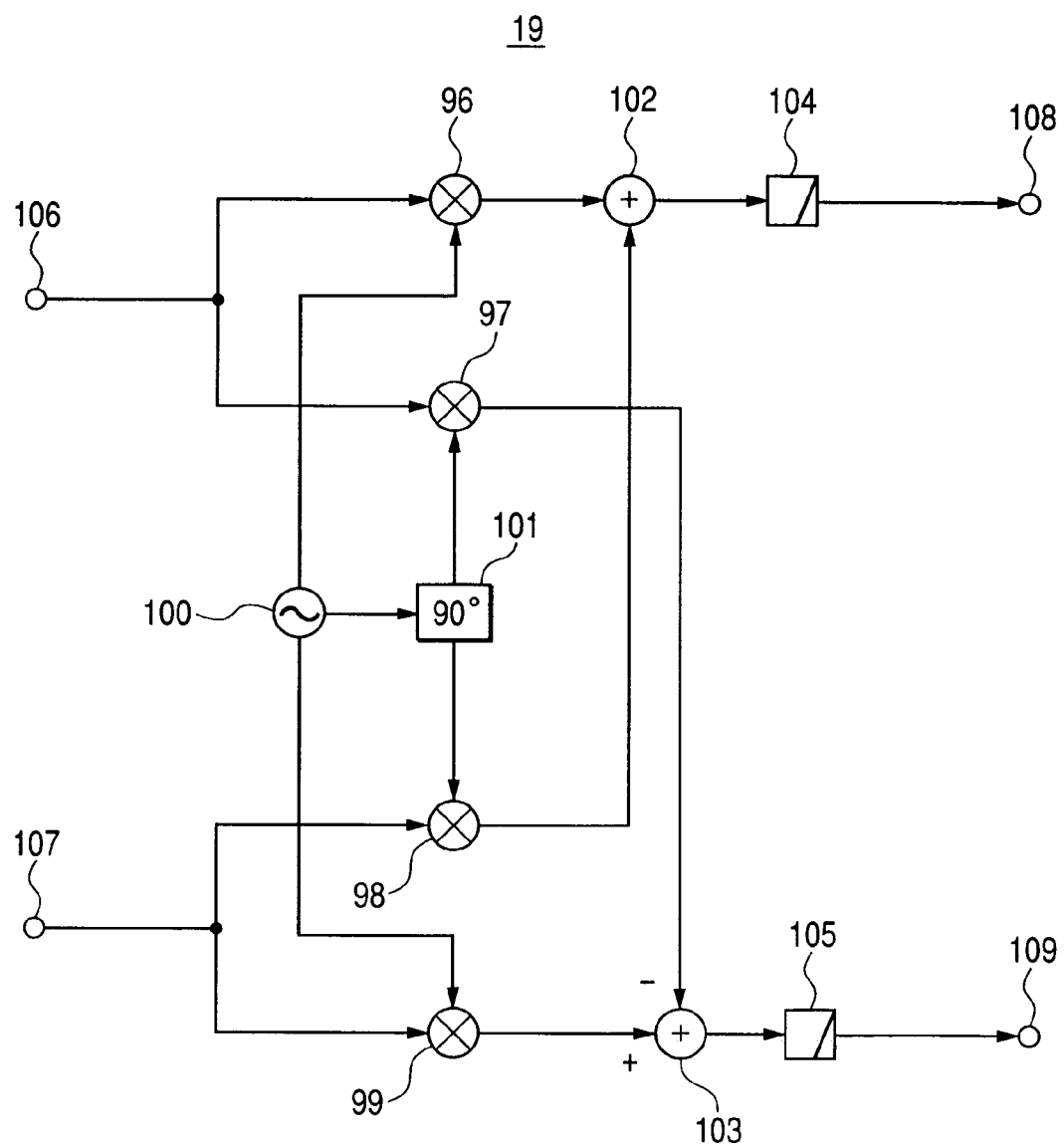
FIG. 11 is a block diagram to explain an image signal rejection circuit involved in the first embodiment.

FIG. 11 shows an example of a configuration of the image signal rejection circuit 19. The image signal rejection circuit 19 shown in FIG. 11 comprises multipliers 96 to 99, a digital 90-degree phase shifter 101, a digital adder 102, a digital subtractor 103, low-pass filters 104 and 105, a digital oscillator 100, input terminals 106 and 107, and output terminals 108 and 109.

To the input terminals 106 and 107, quadrature modulated signals $I_{IF}$ and $Q_{IF}$ having equal amplitudes and accurately orthogonal to each other, calibrated by the calibration circuit for phase and amplitude mismatch 18, respectively expressed by the following equations (6.1) and (6.2) are input.

[Equations 5]

$$I_{IF}=A\cos(\omega_{IF}t+\alpha)+B\cos(-\omega_{IF}t+\beta) \quad (6.1)$$

$$Q_{IF}=A\cos(\omega_{IF}t+\alpha)+B\cos(-\omega_{IF}t+\beta) \quad (6.1)$$

In the above equations, A and B denote the amplitude of desired wave and the amplitude of image wave, α and β denote phase information of desired wave and phase information of image wave, $\omega_{IF}$ denotes IF frequency, and t denotes, time.

The digital oscillator 100 generate tone signals with IF frequency. I components of the tone signals and Q components accurately orthogonal to the I components, generated by the digital 90-degree phase shifter 101, are input to the multipliers 96 to 99 and received signals are frequency converted into baseband frequency. Output of the digital adder 102 and output of the digital subtractor 103 are expressed by $I_B$ and $Q_B$, respectively, in the following equations (6.3) and (6.4).

[Equations 6]

$$I_B=I_{IF}\times\cos(\omega_{IF}t)+Q_{IF}\times\sin(\omega_{IF}t)=A\cos\alpha+B\cos(2\omega_{IF}t-\beta) \quad (6.3)$$

$$Q_B=-I_{IF}\times\sin(\omega_{IF}t)+Q_{IF}\times\cos(\omega_{IF}t)=A\sin\alpha-B\sin(2\omega_{IF}t-\beta) \quad (6.4)$$

Figure 16A:
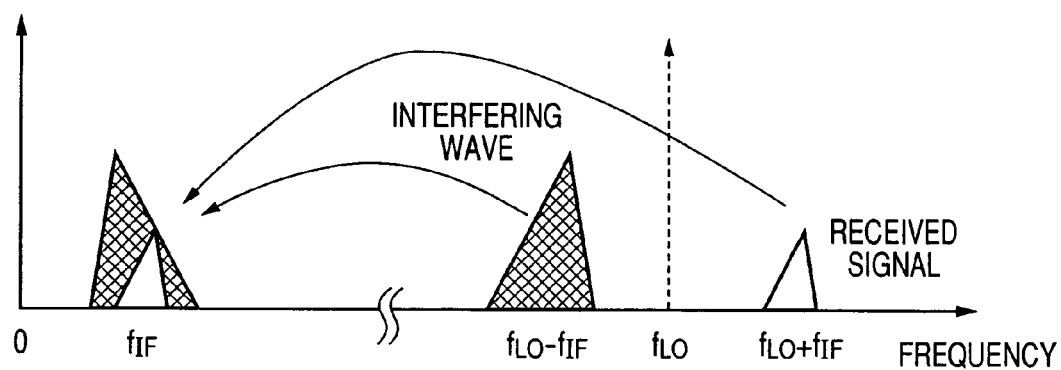
FIG. 16A is a first diagram showing a relationship between a received signal and an image signal.
Figure 16B:
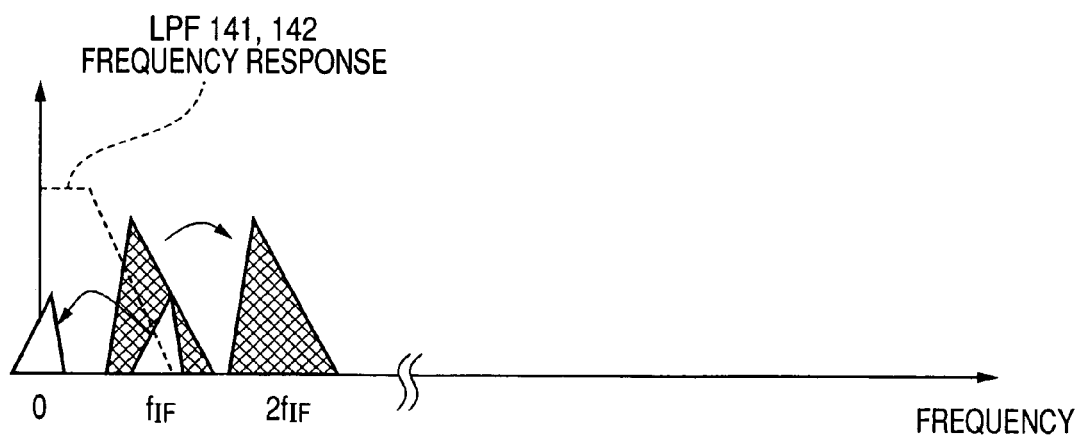
FIG. 16B is a first diagram showing a relationship between a received signal and an image signal.
Figure 17A:
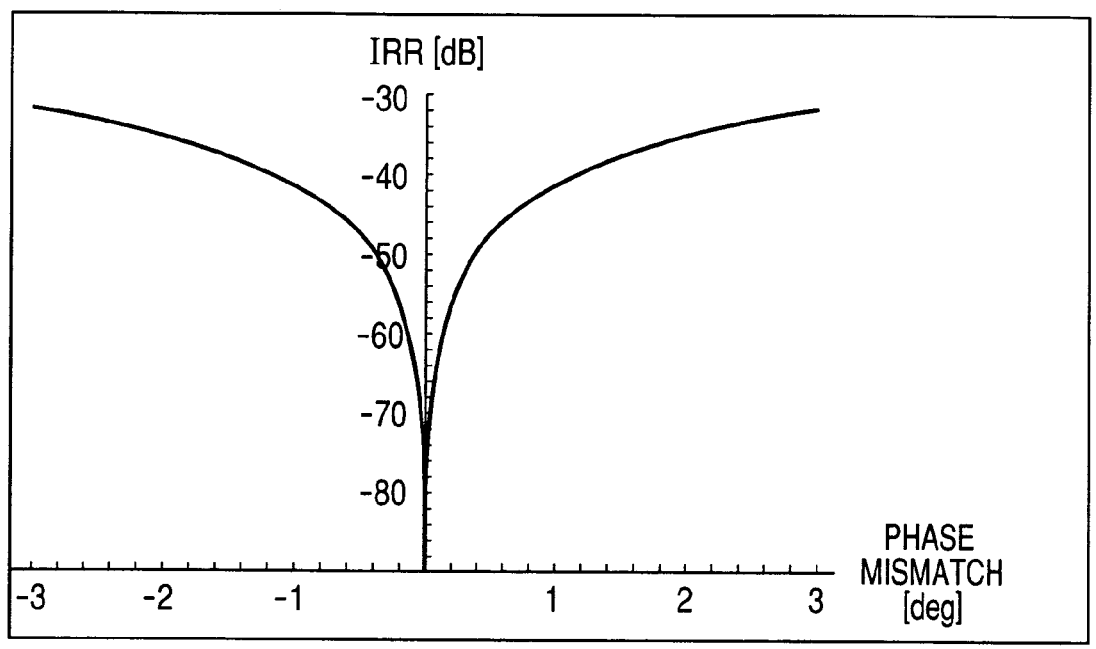
FIG. 17A is a first graph representing IRR sensitivity to mismatch.
Figure 17B:
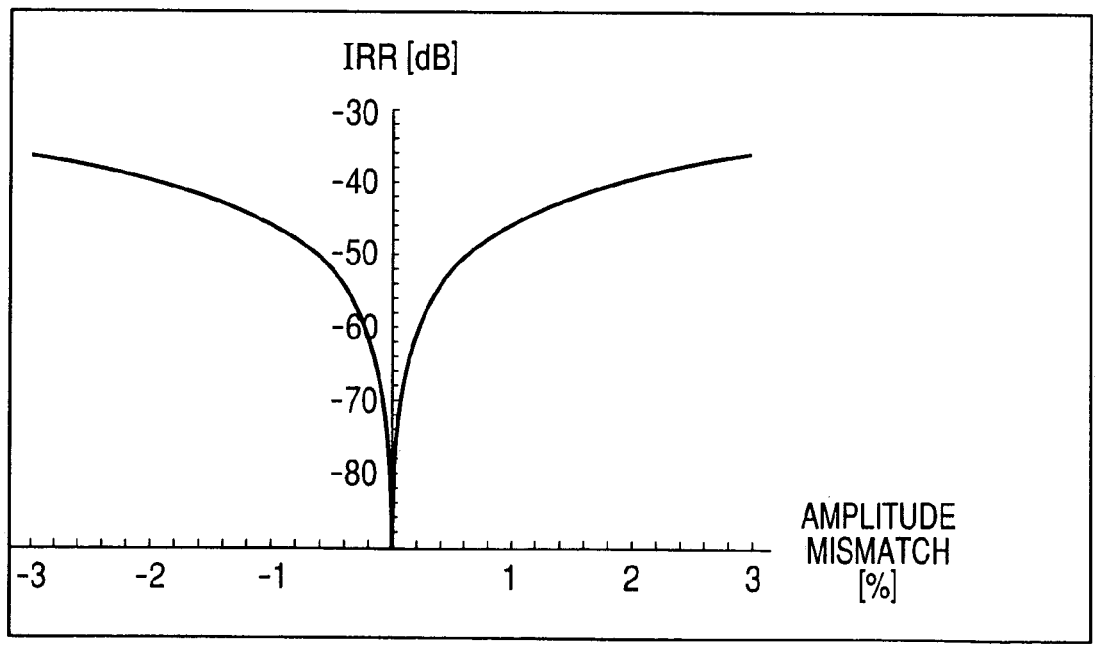
FIG. 17B is a second graph representing IRR sensitivity to mismatch.

Because the image signal can be separated in frequency as shown in FIG. 16B, by eliminating spurious by the low-pass filters 104 and 105, desired wave baseband signals can be obtained, as expressed by the following equations (6.5) and (6.6)

[Equations 7]

$$LPF[I_B]=LPF[A\cos\alpha+B\cos(2\omega_{IF}t-\beta)]=A\cos\alpha \quad (6.5)$$

$$LPF[Q_B]=LPF[A\sin\alpha-B\sin(2\omega_{IF}t-\beta)]=A\sin\alpha \quad (6.5)$$

Figure 12:
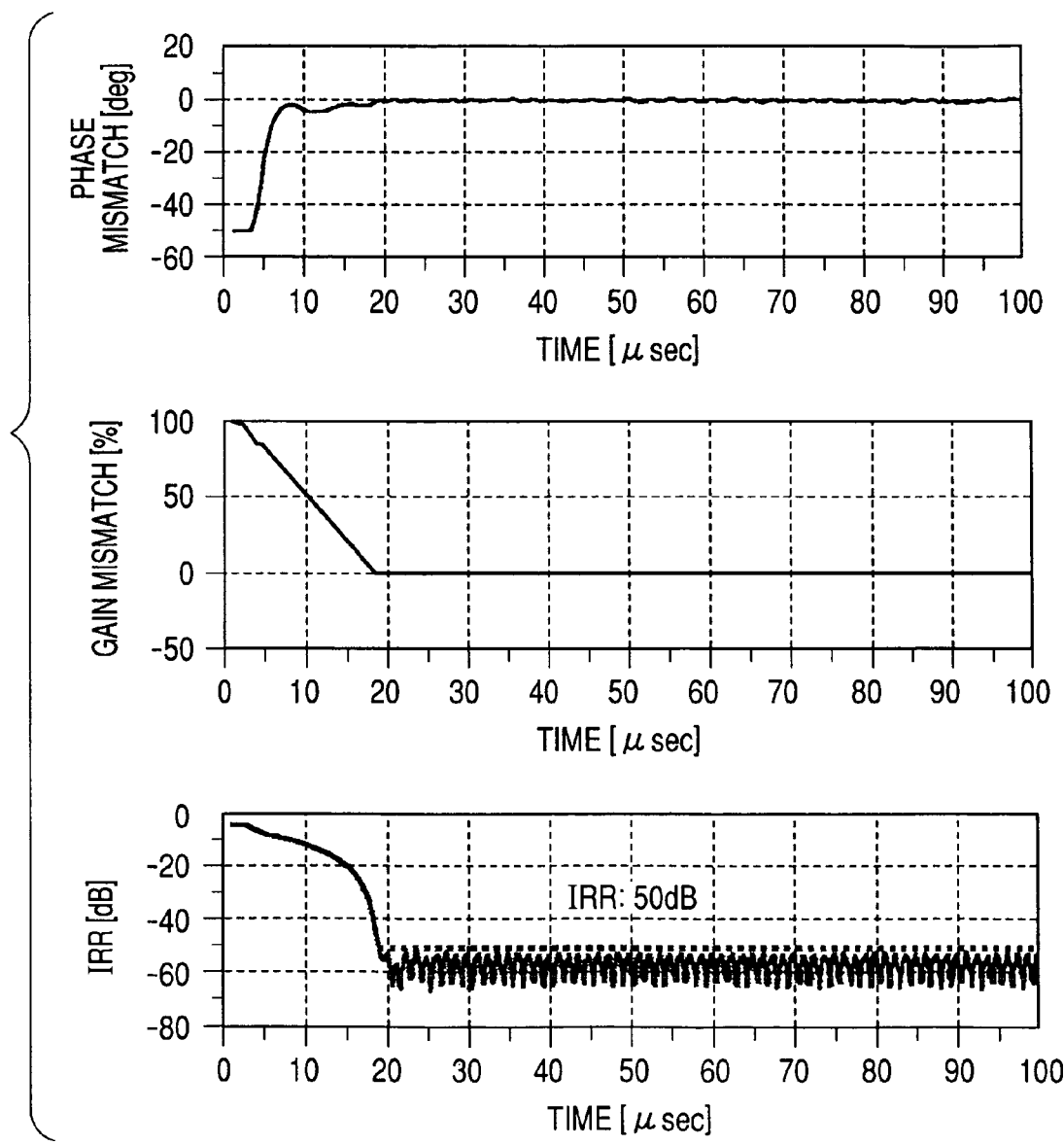
FIG. 12 shows calibration profiles for the receiver of the first embodiment.

According to the described embodiment, in the low-IF receiver, phase and amplitude mismatches can be calibrated to zero within a short period of time. FIG. 12 shows calibration profiles of mismatch calibration performed with the configuration of the present embodiment when a 1-dB amplitude mismatch and a 3-degree phase mismatch are present between I and Q components of quadrature modulated signals. Simulation was performed, assuming that all digital circuits have 14-bit processing power. In FIG. 12, the upper graph shows a phase calibration profile, the middle one shows a amplitude calibration profile, and the lower one shows an IRR calibration profile.

According to FIG. 12, the phase mismatch and the amplitude mismatch are calibrated to zero within a short period of time and IRR of 50 dB or more can be obtained within 20

µsec. In the GSM standards, calibration can be finished within a period of receiving guard signals and, therefore, high-quality communication can always be performed and power consumption can be reduced greatly as compared with the prior art example. By varying the step gain values $k_1$ and $k_2$, even higher IRR can be obtained.

Second Embodiment

Figure 13:
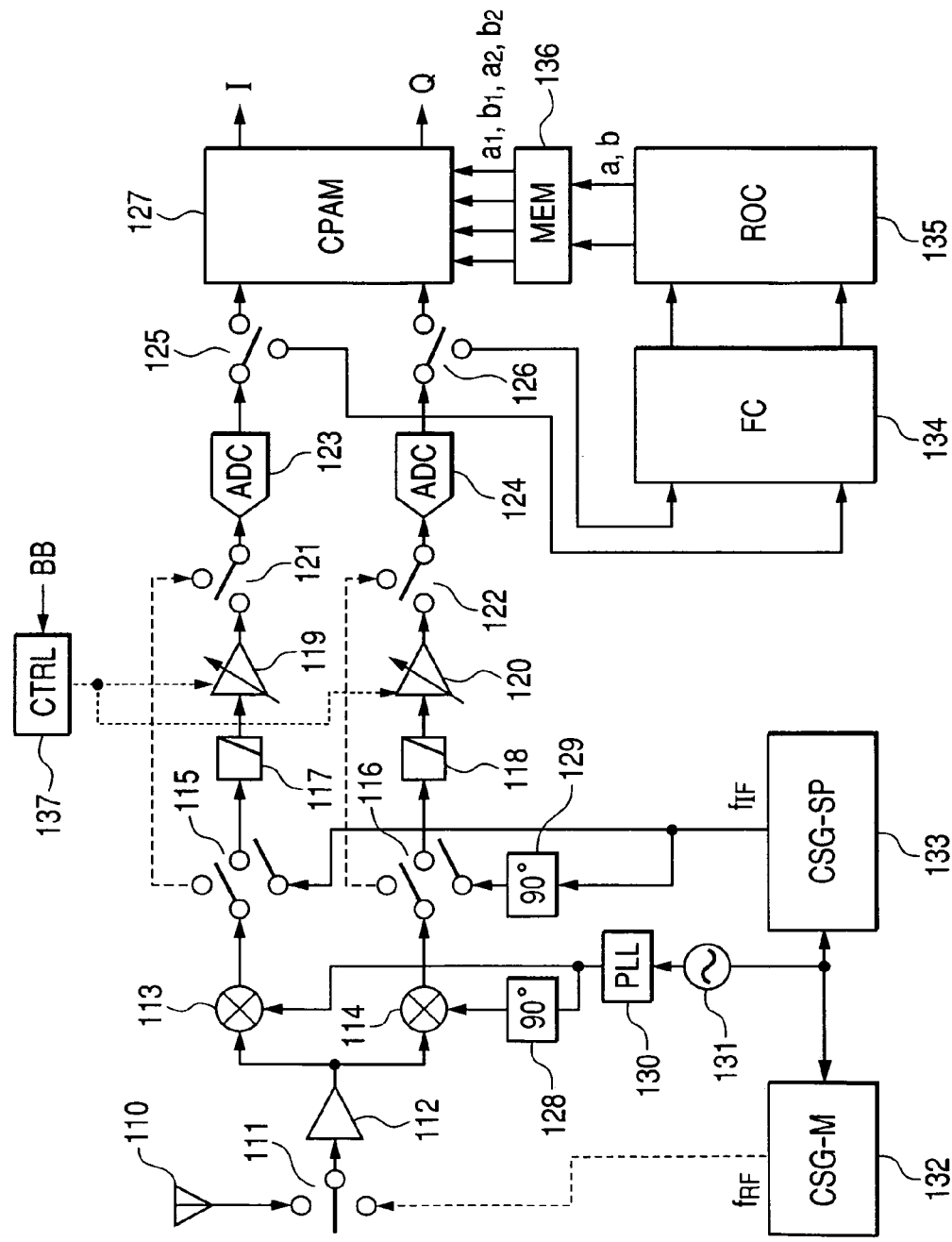
FIG. 13 is a block diagram to explain a second embodiment of the present invention.

FIG. 13 shows a second embodiment of the present invention. This embodiment is a receiver using the zero-IF system. The zero-IF receiver shown in FIG. 13 comprises an antenna 110, switches 111, 115, 116, 121, 122, 125, and 126, an LNA 112, mixers 113 and 114, low-pass filters 117 and 118, automatic gain controlled amplifiers 119 and 120, analog-digital converters 123 and 124, a calibration circuit for phase and amplitude mismatch 127, 90-degree phase shifters 128 and 129, a PLL 130, a crystal oscillator 131, a calibration signal generator for mixer 132, a calibration signal generator for signal path 133, a frequency converter 134, a memory 136, and a repeated operation circuit 135.

In the receiver shown in FIG. 13, the PLL 130 generates carriers in an RF band and received signals are directly frequency converted into baseband signals. In the zero-IF system, because interfering waves (image signals) which are frequency converted are not present in the same frequency band as the received signal band, the image rejection circuit 17 used in the low-IF receiver is not needed. The frequency of calibration signals that are generated in mismatch calibration mode for signal path falls within the received signal band and is not attenuated by the low-pass filters 117 and 118. When the calibration signals are mixed with a DC offset, correct detection of a mismatch becomes impossible. Thus, a frequency other than DC is selected as the frequency of the calibration signals. For other processing details, the same as described for the first embodiment is performed.

According to the second embodiment, in the zero-IF receiver, phase and amplitude mismatches can be calibrated to zero within a short period of time. The receiver configuration of the second embodiment shown in FIG. 13 is the same as the receiver configuration of the first embodiment shown in FIG. 1 except for dispensing with the image rejection circuit 19.

In short, according to the present invention, the low-IF receiver and the zero-IF receiver can be configured in the same way and can be expected to have the same effect. Therefore, for instance, the present invention can be applied to a receiver equipped with both low-IF system and zero-IF system so as to be compatible with a plurality of wireless communication standards without increasing the circuitry scale.

If, for example, a wireless terminal is configured to function as a GSM compliant receiver and as a W-CDMA (Wideband Code Division Multiple Access) compliant receiver, the former receiver is built as a low-IF receiver and the latter as a zero-IF receiver and it becomes easy to make analog parts of the receivers as common parts to be shared by both receivers by applying the present invention.

If the zero-IF receiver system is applied in compliance with TDMA (Time Division Multiple Access) communication standards such as GSM/EDGE (Enhanced Data rates for GSM Evolution), a DC offset rejection method taking advantage of receiving intervals is widely used.

Figure 18A:
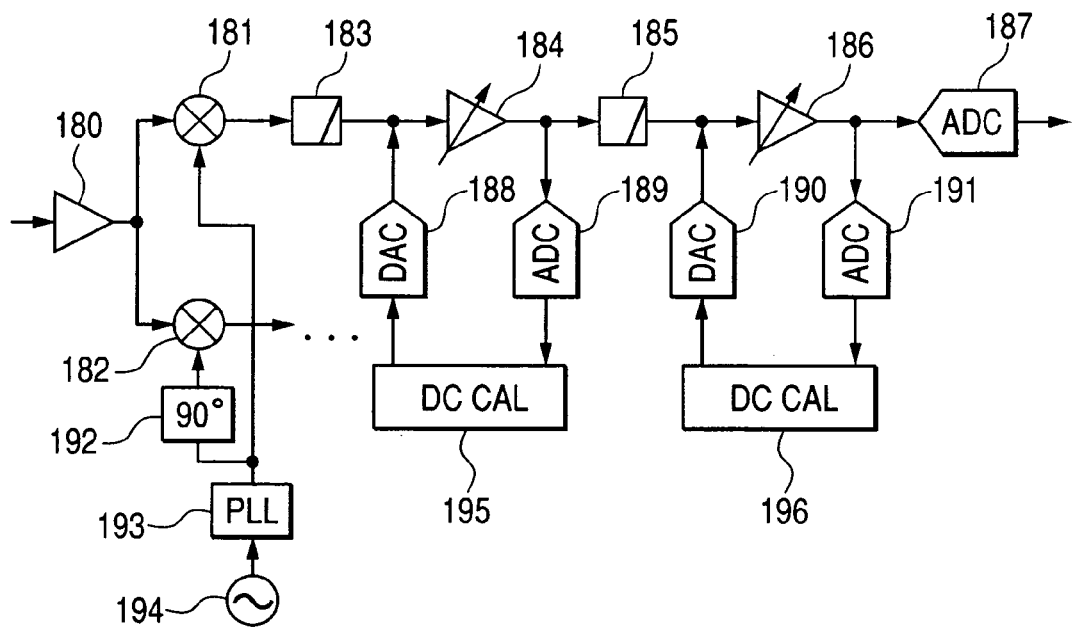
FIG. 18A shows a typical configuration of a zero-IF receiver compliant with GSM/EDGE standards.

FIG. 18A shows an example of a typical configuration of a zero-IF receiver compliant with GSM/EDGE standards. In FIG. 18A, RF-band signals received by the antenna are amplified by an LNA 180 and input to mixers 181 and 182. Based on the reference signal 194, a PLL 193 generates carriers with the same frequency as the frequency of received signals. The generated carriers are input to the two mixers; one carrier is input directly to a mixer 181 and another is input via a 90-degree phase shifter 192 to a mixer 182. The received signals are multiplied with the carriers by the mixers 181 and 182 and frequency converted into baseband frequency. Then, spurious is eliminated by low-pass filters 183 and 185, gain is adjusted by automatic gain controlled amplifiers 184 and 186, and baseband signals are converted into digital baseband signals by an ADC 187. FIG. 18A shows the I-signal path only, omitting the Q-signal path.

In the case of GSM/EDGE, the signal band is relatively narrow, 260 kHz and the center frequency has strong power. For this reason, DC offset rejection by high-pass filters leads to signal deterioration. Thus, the following DC offset rejection method is taken. With ADCs 189 and 191 and DC offset detectors 195 and 196, a DC component is detected in a digital domain during an interval time of receiving. During signal reception, an analog signal corresponding to a DC value counterbalancing the DC component detected is added to received signals by digital-analog converters (DACs) 188 and 190.

Figure 18B:
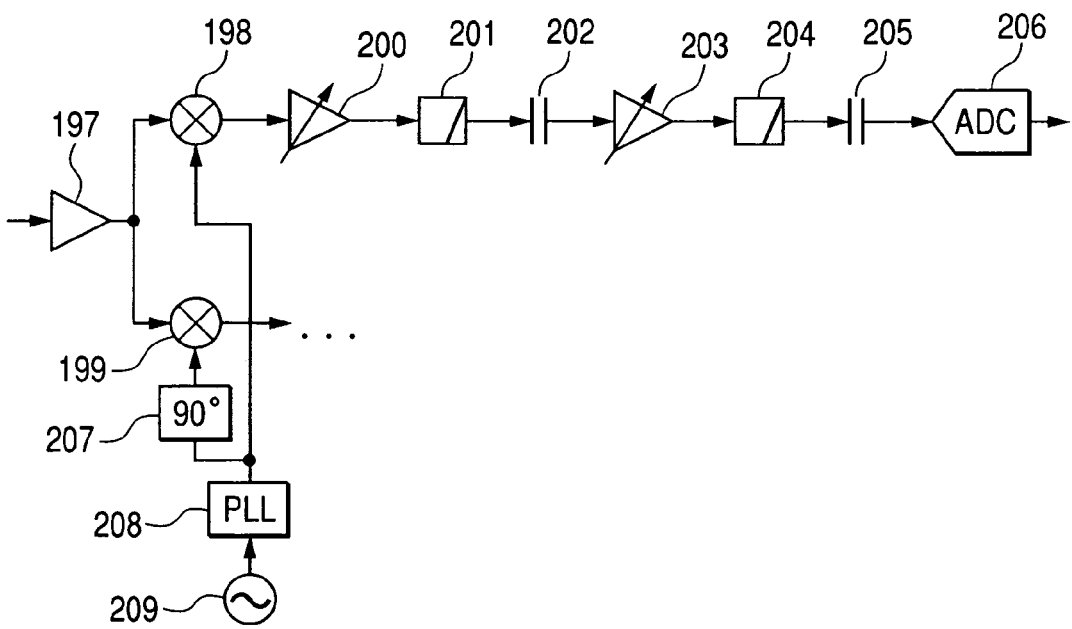
FIG. 18B shows a typical configuration of a zero-IF receiver compliant with W-CDMA standards.

Meanwhile, in W-CDMA, there is no receiving interval and the signal band is relatively wide; therefore, DC offset rejection by high-pass filters is possible. FIG. 18B shows an example of a typical configuration of the zero-IF receiver compliant with W-CDMA standards. RF-band signals received by the antenna are amplified by an LNA 197 and input to mixers 198 and 199. Based on the reference signal 209, a PLL 208 generates carriers with the same frequency as the frequency of received signals. The generated carriers are input to the two mixers; one carrier is input directly to a mixer 198 and another is input via a 90-degree phase shifter 207 to a mixer 199. The received signals are multiplied with the carriers by the mixers 198 and 199 and frequency converted into baseband frequency. Then, spurious is eliminated by low-pass filters 201 and 204, gain is adjusted by automatic gain controlled amplifiers 202 and 203, and baseband signals are converted into digital baseband signals by an ADC 206. Here, DC offset is eliminated by high-pass filters 202 and 205, unlike the above. FIG. 18B shows the I-signal path only, omitting the Q-signal path.

In the case of a low-IF receiver compliant with GSM/EDGE standards, by selecting a suitable IF frequency, for example, 200 kHz, DC offset can be eliminated by high-pass filters and the same configuration as shown in FIG. 18B can be used. Therefore, the GSM/EDGE compliant low-IF receiver does not require complicated DC offset calibration which has been used conventionally. Moreover, this type of receiver can share analog parts with the W-CDMA compliant zero-IF receiver. As both receivers share common analog parts, chip area saving is expected.

Third Embodiment

Figure 19:
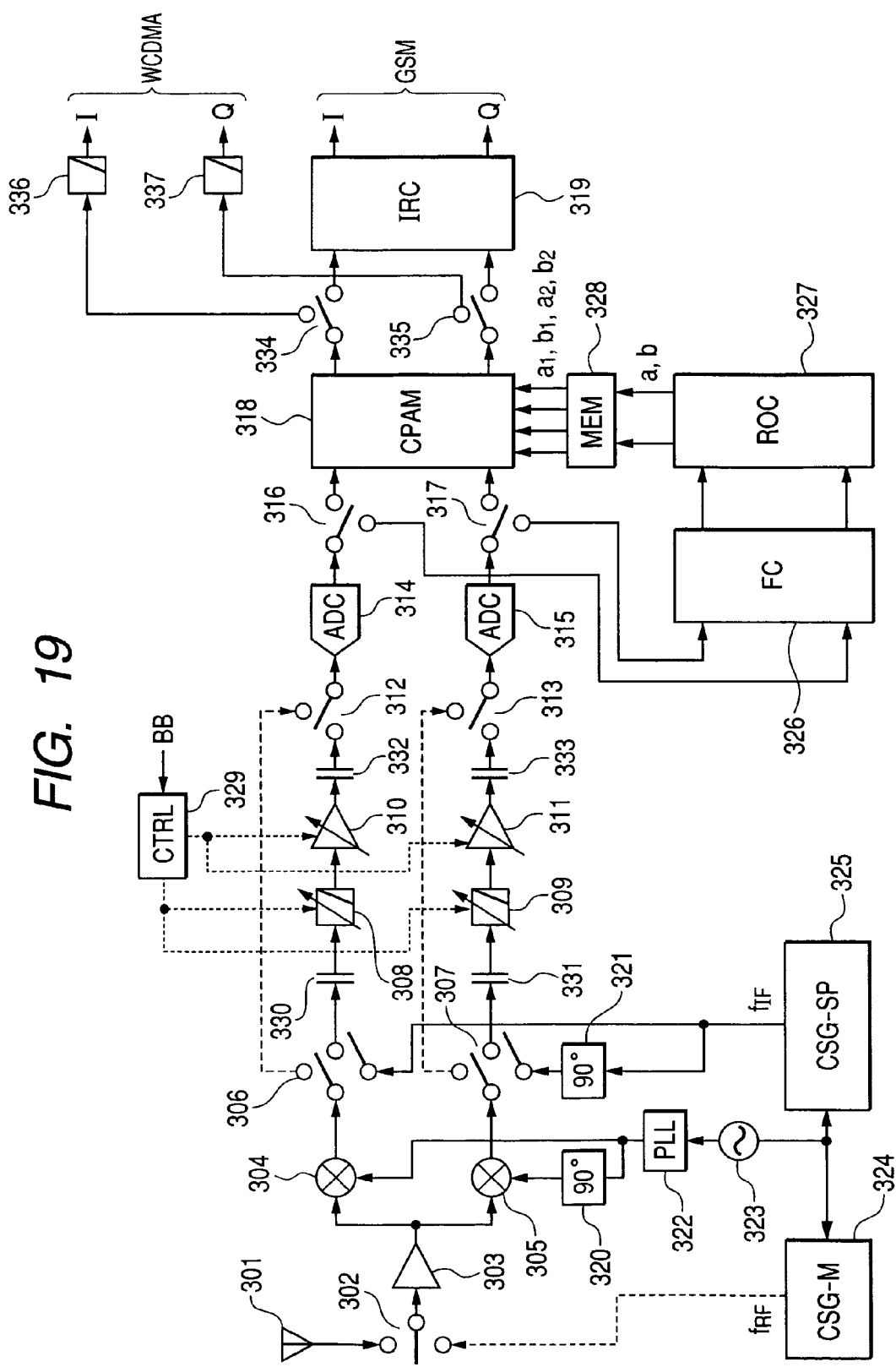
FIG. 19 is a block diagram to explain a third embodiment of the present invention.

FIG. 19 shows a third embodiment of the present invention. This embodiment is a receiver compatible with GSM/EDGE/W-CDMA standards The receiver compatible with GSM/EDGE/W-CDMA standards shown in FIG. 19 comprises an antenna 301, switches 302, 306, 307, 312, 313, 316, 317, 334, and 335, an LNA 303, mixers 304 and 305, variable low-pass filters 308 and 309, automatic-gain controlled amplifiers 310 and 311, analog-digital converters 314 and 315, a calibration circuit for phase and amplitude mismatch 318, 90-degree phase shifter 320 and 321, a PLL 322, a crystal oscillator 323, a calibration signal generator for mixer 324, a calibration signal generator for signal path 325, a frequency converter 326, a memory 328, a repeated operation circuit 327, high-pass filters 330, 331, 332, and 333, and low-pass filters 336 and 337.

The receiver configured as above operates in an optimum communication scheme which is selected from among GSM, EDGE and W-CDMA standards by the baseband (BB) circuit connected to the receiver, according to radio environment and data to be transmitted and received when the receiver is powered up.

If a communication scheme corresponding to GSM/EDGE standards is selected, the receiver of this embodiment performs low-IF receive operation and carries out almost the same processing as described for the first embodiment. In this case, the frequency responses of variable low-pass filters 308 and 309 are controlled by the control circuit (CTRL) 329 which inputs a control signal provided from the baseband circuit and these filters are set to frequency responses suitable for GSM/EDGE standards.

Because DC offset is eliminated by high-pass filters 330, 331, 332, and 333 with high precision, it is not needed to perform DC offset calibration. Consequently, calibration timing in mismatch calibration mode for signal path somewhat differs from that shown in FIG. 4. That is, before receiving a burst signal, the receiver reads parameters such as AGC gain, based on radio environment measurements taken during the reception of the previous frame burst, followed by locking synthesizer. Then, the receiver performs calibration in mismatch calibration mode for signal path and receives the burst. Quadrature modulated signals output from the calibration circuit for phase and amplitude mismatch 318 are input via switches 334 and 335 to the image rejection circuit 319 where high-precision image signal rejection takes place and the modulated signals are frequency converted into I and Q components of baseband signals. For other processing details, the receiver performs the same as described for the first embodiment.

If a communication scheme corresponding to W-CDMA standards is selected, the receiver of this embodiment performs zero-IF receive operation. In the zero-IF receive operation, image rejection is not needed and received signals are QPSK modulated signals. Because significant deterioration in BER does not result from phase and amplitude mismatches to a degree that typical ICs experience, it is not needed to perform the above mismatch calibration mode for signal path to calibrate phase and amplitude mismatches occurring in the signal paths. Thus, only the mismatch calibration mode for mixer to calibrate phase and amplitude mismatches occurring in the mixers 304 and 305 is performed after the receiver is powered up. When the communication scheme corresponding to W-CDMA standards is selected, the frequency responses of variable low-pass filters 308 and 309 are controlled by the controlled by the control circuit (CTRL) 329 which inputs a control signal provided from the baseband (BB) circuit and these filters are set to frequency responses suitable for W-CDMA standards.

The quadrature modulated signals consisting of I and Q components, output from the calibration circuit for phase and amplitude mismatch 318 are input via switches 334 and 335 to the low-pass filters 336 and 337 and, after spurious is eliminated, the modulated signals are input to the baseband circuit. For other processing details, the receiver performs the same as described for the second embodiment.

According to the present embodiment, phase and amplitude mismatches can be calibrated to zero within a short period of time for any of prevailing mobile communications standards By using common analog circuits, the receiver compatible with GSM/EDGE/W-CDMA standards can be realized without increasing circuitry scale. As common circuits are used, chip area saving is expected.

Fourth Embodiment

Figure 14:
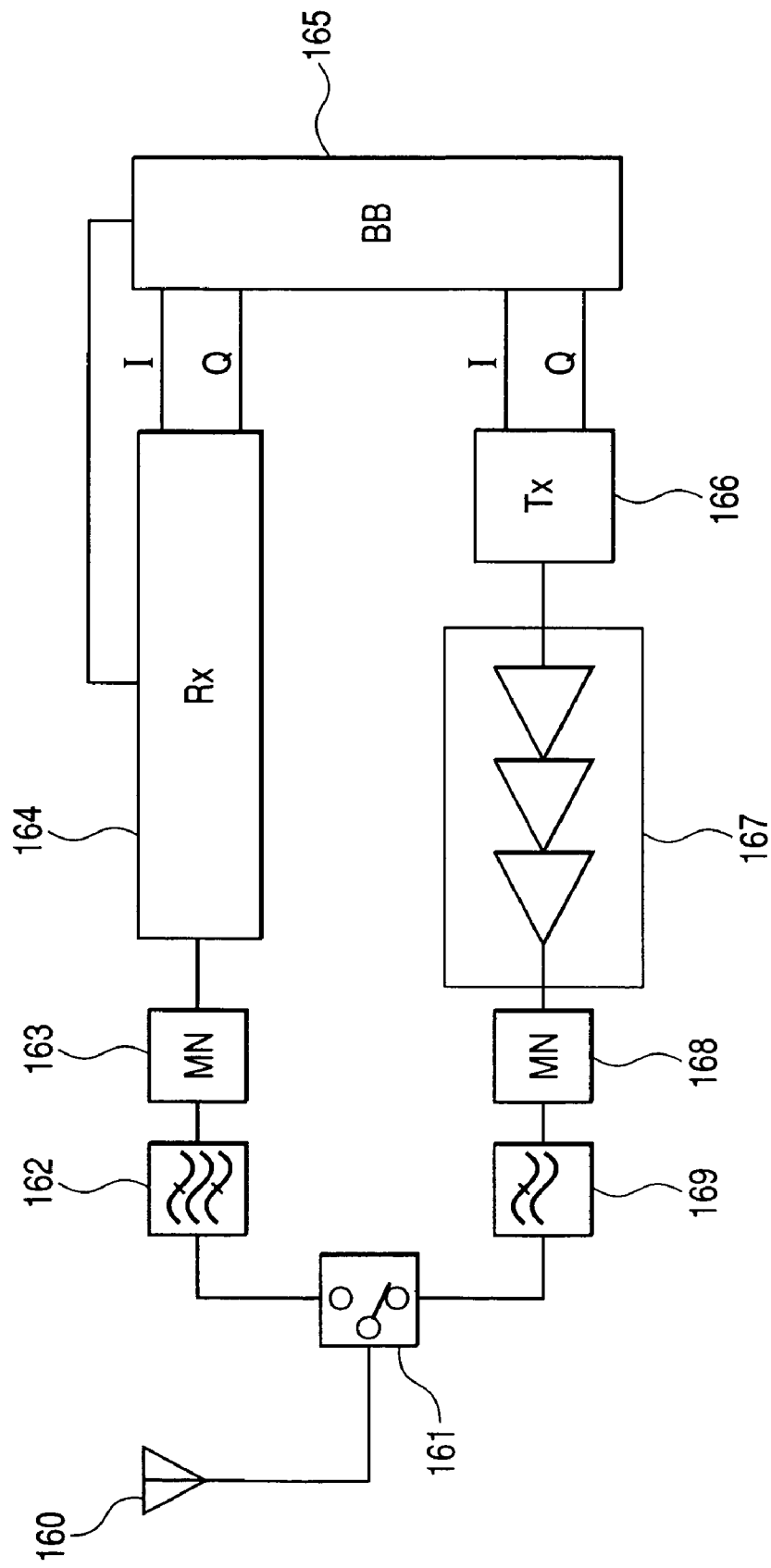
FIG. 14 is a block diagram to explain a fourth embodiment of the present invention.
Figure 15:
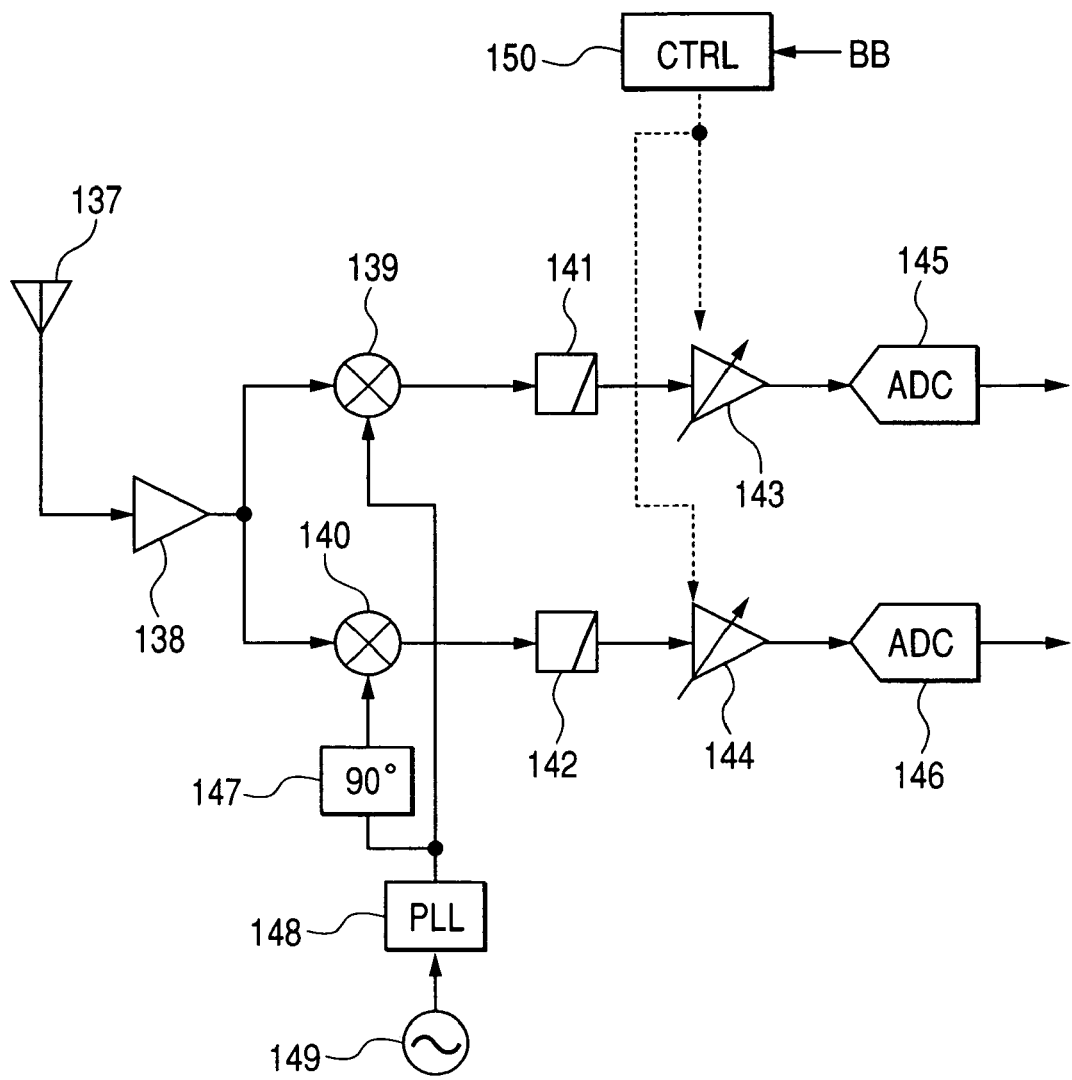
FIG. 15 is a block diagram to explain a commonly used receiver configuration.

FIG. 14 shows a fourth embodiment of the present invention. This embodiment is a portable wireless apparatus such as a mobile phone, using the receiver of the first, second, or third embodiment. The portable wireless apparatus shown in FIG. 14 comprises an antenna 160, a switch 161, a bandpass filter 162, a receiver matching network (MN) 163, a receiver (Rx) 164 shown in FIG. 1 or FIG. 13, a baseband (BB) circuit 165, a transmitter (Tx) circuit 166, a power amplifier 167, a transmitter matching network (MN) 138, and a low-pass filter 169.

Signals received by the antenna 160 pass through the switch 161 which switches over between transmission and receiving, further pass through the band pass filter 162 for spurious rejection and the receiver matching network, and input to the receiver 164. I and Q components of baseband signals obtained in the receiver 164, which have been mismatch calibrated in phase and amplitude, are supplied to the baseband circuit 165.

The baseband circuit 165 carries out baseband signal processing to input and output the I and Q components of baseband signals and sends and receives the signals to/from a microphone, speaker, keyboard, display device, etc., which are not shown. Moreover, the baseband circuit 165 generates control signals to control all components of the apparatus.

I and Q components of baseband signals generated in the baseband circuit 165 are input to the transmitter circuit 166. The transmitter circuit 166 carries out quadrature modulation on the input I and Q components and outputs quadrature-modulated transmit signals. The transmit signals pass through the transmitter matching network 168 and the low-pass filter 169 for spurious rejection and are directed to the antenna 160 via the switch 161.

By using the receiver of the present invention featuring shorter calibration by repeated operations, the portable wireless apparatus of the present embodiment can reduce phase and amplitude mismatches between I and Q components of quadrature signals, occurring due to variance of elements, and thus can obtain high BER when receiving. The portable wireless apparatus using the low-IF receiver is capable of high-precision image rejection in the digital domain.

What is claimed is:

1. A receiver comprising:
   mixers which convert received signals having in-phase (I) and quadrature (Q) components with a first frequency into quadrature modulated signals with a second frequency;
   signal paths which at least amplify and output said quadrature modulated signals output from said mixers;
   a calibration circuit for phase and amplitude mismatch which calibrates phase and amplitude mismatches between the I and Q components of said quadrature modulated signals output through said signal paths;
   a frequency converter which, when said mixers or said signal paths selected output calibration signals having I and Q components with said second frequency instead of said quadrature modulated signals, converts said calibration signals into calibration signals with a third frequency higher than said second frequency; and
   an arithmetic operation circuit which calculates phase and amplitude mismatches between the I and Q components from the calibration signals with said third frequency output by said frequency converter and outputs calculation results, wherein said calibration circuit for phase and amplitude mismatch executes the calibration, using said calculation results.

2. The receiver according to claim 1,
wherein said calibration signals output through said signal paths include first signals which are output by said mixers when first calibration signals with said first frequency are input to said mixers instead of said received signals and second signals which are output through said signal paths when second calibration signals having I and Q components with said second frequency are input to said signal paths instead of said quadrature modulated signals, wherein said arithmetic operation circuit outputs first calculation results when said calibration signals are first signals and second calculation results when said calibration signals are second signals, and wherein said calibration circuit for phase and amplitude mismatch executes first calibration by using said first calculation results and second calibration by using said second calculation results and said calibration is comprised of said first and second calibrations.

3. The receiver according to claim 2, further including a nonvolatile memory to store said first calculation results and said second calculation results, wherein said calibration circuit for phase and amplitude mismatch uses said first and second calculation results stored in said nonvolatile memory.

4. The receiver according to claim 3, wherein said first calculation results are calculated and stored into said nonvolatile memory before a product equipped with the receiver is shipped from the factory.

5. The receiver according to claim 3, wherein, if each of said received signal frames is time-divided into a plurality of burst signals, said second calculation results are calculated per burst signal before receiving the burst signal and stored into said nonvolatile memory.

6. The receiver according to claim 2, wherein said first calibration signals are said first frequency signals extracted from among harmonics components of a clock signal of said receiver.

7. The receiver according to claim 2, wherein said second calibration signals are said second frequency signals obtained by frequency dividing a clock signal of said receiver.

8. The receiver according to claim 1, wherein, after converting the calibration signals with said second frequency into baseband signals and spurious is eliminated from the baseband signals, said frequency converter converts the baseband signals into calibration signals with said third frequency.

9. The receiver according to claim 1, further including a nonvolatile memory to store said calculation results, wherein said calibration circuit for phase and amplitude mismatch uses said calculation results stored in said nonvolatile memory.

10. The receiver according to claim 1,
wherein each of said signal paths includes an analog-digital converter at its output end and the analog-digital converter outputs said quadrature modulated signals in digital form, and wherein said calibration circuit for phase and amplitude mismatch takes input of said quadrature modulated signals in digital form and executes said calibration by digital signal processing.

11. A receiving method comprising the steps of:
converting received signals having I and Q components with a first frequency into quadrature modulated signals with a second frequency by mixers;

calibrating phase and amplitude mismatches between the I and Q components of said quadrature modulated signals passed through signal paths which at least amplify and output said quadrature modulated signals output from said mixers;

when said quadrature modulated signals output by said mixers or said quadrature modulated signals passed through said signal paths, which have been selected, are changed to calibration signals having I and Q components with said second frequency, converting said calibration signals into calibration signals with a third frequency higher than said second frequency; and calculating phase and amplitude mismatches between the I and Q components from the calibration signals with said third frequency and outputting calculation results, wherein said step of calibrating phase and amplitude mismatches executes calibration, using said calculation results.

12. The receiving method according to claim 11,
wherein said calibration signals include first signals which are obtained as results of conversion by said mixers when first calibration signals with said first frequency are input to said mixers instead of said received signals and second signals which are output through said signal paths when second calibration signals having I and Q components with said second frequency are input to said signal paths instead of said quadrature modulated signals, wherein said results of calculating phase and amplitude mismatches become first calculation results when said calibration signals are first signals and second calculation results when said calibration signals are second signals, and wherein said step of calibrating phase and amplitude mismatch executes first calibration by using said first calculation results and second calibration by using said second calculation results and said calibration is comprised of said first and second calibrations.

13. The receiving method according to claim 12, wherein said first calculation results are calculated before factory shipment.

14. The receiving method according to claim 12, wherein, if each of said received signal frames is time-divided into a plurality of burst signals, said second calculation results are calculated per burst signal before receiving the burst signal.

15. The receiving method according to claim 11, wherein, after the calibration signals with said second frequency are converted into baseband signals and spurious is eliminated from the baseband signals, the baseband signals are converted into calibration signals with said third frequency.

16. The receiving method according to claim 11, wherein said quadrature modulated signals passed through said signal paths are digitized and said step of calibrating phase and amplitude mismatch executes calibration on the digitized quadrature modulated signals.

17. A portable wireless apparatus comprising:
an antenna;
a switch which is connected to said antenna and switches over the connection between transmission and receiving;
a receiver linked to the receiving side of said switch;
a baseband circuit which takes input of baseband received signals having I and Q components output from said receiver and generates and outputs baseband transmit signals having I and Q components;
a transmitter circuit which outputs quadrature modulated signals with a first frequency generated by carrying out quadrature modulation of said baseband transmit signals; and
a power amplifier which is linked to the transmission side of said antenna and amplifies said quadrature modulated signals with the first frequency,
said receiver comprising:
mixers which convert received signals having I and Q components with the first frequency into quadrature modulated signals with a second frequency;
signal paths which at least amplify and output said quadrature modulated signals output from said mixers;
a calibration circuit for phase and amplitude mismatch which calibrates phase and amplitude mismatches between the I and Q components of said quadrature modulated signals output through said signal paths;
a frequency converter which, when said mixers or said signal paths selected output calibration signals having I and Q components with said second frequency instead of said quadrature modulated signals, converts said calibration signals into calibration signals with a third frequency higher than said second frequency; and
an arithmetic operation circuit which calculates phase and amplitude mismatches between the I and Q components from the calibration signals with said third frequency output by said frequency converter and outputs calculation results,
wherein said calibration circuit for phase and amplitude mismatch executes the calibration, using said calculation results.

18. The portable wireless apparatus according to claim 17, wherein said calibration signals include first signals which are output by said mixers when first calibration signals with said first frequency are input to said mixers instead of said received signals and second signals which are output through said signal paths when second calibration signals having I and Q components with said second frequency are input to said signal paths instead of said quadrature modulated signals,
wherein said arithmetic operation circuit outputs first calculation results when said calibration signals are first signals and second calculation results when said calibration signals are second signals, and
wherein said calibration circuit for phase and amplitude mismatch executes first calibration by using said first calculation results and second calibration by using said second calculation results and said calibration is comprised of said first and second calibrations.

19. The portable wireless apparatus according to claim 17, wherein, after converting the calibration signals with said second frequency into baseband signals and spurious is eliminated from the baseband signals, said frequency converter converts the baseband signals into calibration signals with said third frequency.

20. The portable wireless apparatus according to claim 17, wherein each of said signal paths includes an analog-digital converter at its output end and the analog-digital converter outputs said quadrature modulated signals in digital form, and
wherein said calibration circuit for phase and amplitude mismatch takes input of said quadrature modulated signals in digital form and executes said calibration by digital signal processing.

* * * * *